(12) United States Patent
Cosley et al.

(10) Patent No.: US 11,186,986 B2
(45) Date of Patent: Nov. 30, 2021

(54) SLEEVE ASSEMBLY FOR A POURED CONCRETE DECK

(71) Applicant: Reliance Worldwide Corporation, Poway, CA (US)

(72) Inventors: James W. Cosley, Poway, CA (US); Dennis L. Hart, Poway, CA (US); Virgil O'Neil, Poway, CA (US)

(73) Assignee: Reliance Worldwide Corporation, Poway, CA (US)

( * ) Notice: Subject to any disclaimer, the term of this patent is extended or adjusted under 35 U.S.C. 154(b) by 0 days.

(21) Appl. No.: 16/584,621

(22) Filed: Sep. 26, 2019

(65) Prior Publication Data

US 2020/0102736 A1    Apr. 2, 2020

Related U.S. Application Data

(60) Provisional application No. 62/739,006, filed on Sep. 28, 2018.

(51) Int. Cl.

| | |
|---|---|
| *F16L 5/04* | (2006.01) |
| *E04B 1/94* | (2006.01) |
| *E04B 5/48* | (2006.01) |
| *E04G 15/06* | (2006.01) |
| *F16L 5/00* | (2006.01) |
| *A62C 2/06* | (2006.01) |

(52) U.S. Cl.
CPC .............. *E04B 1/948* (2013.01); *A62C 2/065* (2013.01); *E04B 5/48* (2013.01); *E04G 15/061* (2013.01); *F16L 5/00* (2013.01)

(58) Field of Classification Search
CPC .... F16L 5/00; F16L 5/04; E04B 1/948; E04B 5/48; A62C 2/065; H02G 3/0412
See application file for complete search history.

(56) References Cited

U.S. PATENT DOCUMENTS

| | | | | |
|---|---|---|---|---|
| 4,669,759 A | * | 6/1987 | Harbeke ................ | A62C 2/065 277/314 |
| 4,850,385 A | * | 7/1989 | Harbeke ................ | A62C 2/065 137/75 |
| 4,888,925 A | * | 12/1989 | Harbeke ............... | E04G 15/061 52/232 |
| 4,916,800 A | * | 4/1990 | Harbeke ............... | E04G 15/061 29/469 |
| 5,347,767 A | * | 9/1994 | Roth ...................... | A62C 2/065 52/1 |
| 5,390,465 A | * | 2/1995 | Rajecki .................. | A62C 2/065 285/211 |
| 6,161,873 A | * | 12/2000 | Munzenberger ...... | E04G 15/061 285/3 |
| 6,176,052 B1 | * | 1/2001 | Takahashi ................ | F16L 5/04 137/75 |
| 6,467,734 B1 | | 10/2002 | Brown et al. | |

(Continued)

*Primary Examiner* — Adriana Figueroa
(74) *Attorney, Agent, or Firm* — Merchant & Gould P.C.

(57) ABSTRACT

A sleeve assembly for poured concrete decks has a tubular sleeve connected to a base flange by stiffeners or an optional base wall. An intumescent ring and fire ring plate are fastened to the base flange. The stiffeners and optional base wall are configured so concrete passes between the stiffeners to entrain a fire ring plate and ring of intumescent material in the concrete by passing through a gap between the base wall and the sleeve or through open windows in the base wall to entrain the base wall when it is present.

21 Claims, 13 Drawing Sheets

(56) References Cited

U.S. PATENT DOCUMENTS

| | | | |
|---|---|---|---|
| 6,694,684 B2 * | 2/2004 | Radke | E04G 15/061 |
| | | | 285/4 |
| 7,080,486 B2 * | 7/2006 | Radke | E04G 15/061 |
| | | | 285/3 |
| 7,527,225 B1 | 5/2009 | Schulz et al. | |
| 8,188,382 B2 * | 5/2012 | Monden | H02G 3/22 |
| | | | 174/505 |
| 9,086,174 B2 * | 7/2015 | McConnell | A62C 2/065 |
| 9,103,116 B2 * | 8/2015 | McConnell | E04F 17/08 |
| 9,476,199 B2 * | 10/2016 | McConnell | E04B 1/948 |
| 2004/0016190 A1 * | 1/2004 | Radke | E04G 15/061 |
| | | | 52/232 |

* cited by examiner

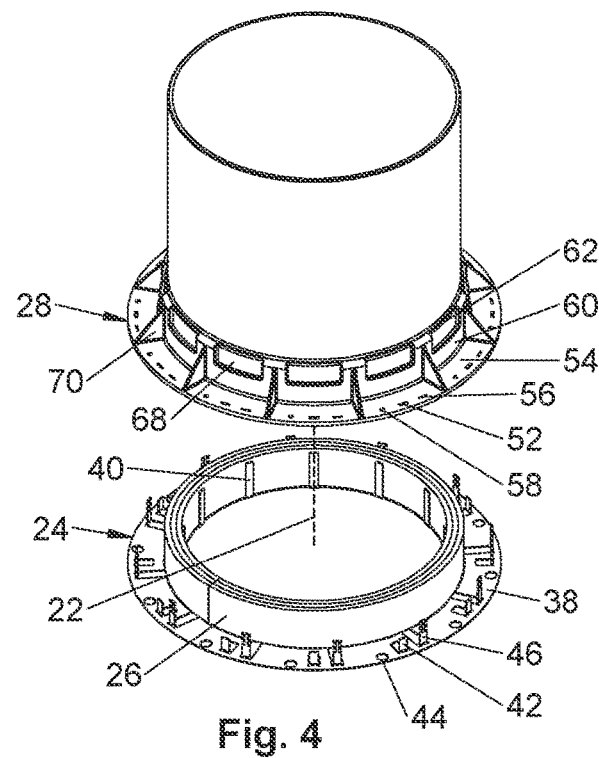
Fig. 4
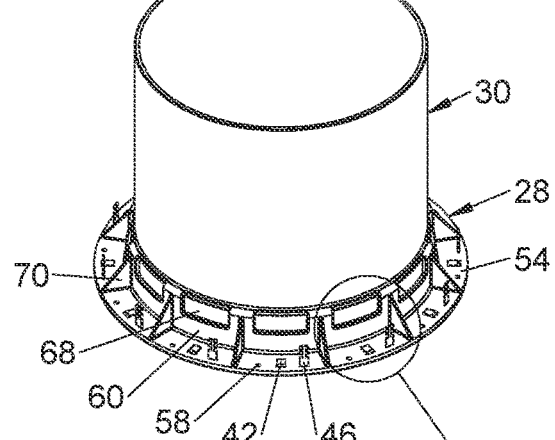
Fig. 5
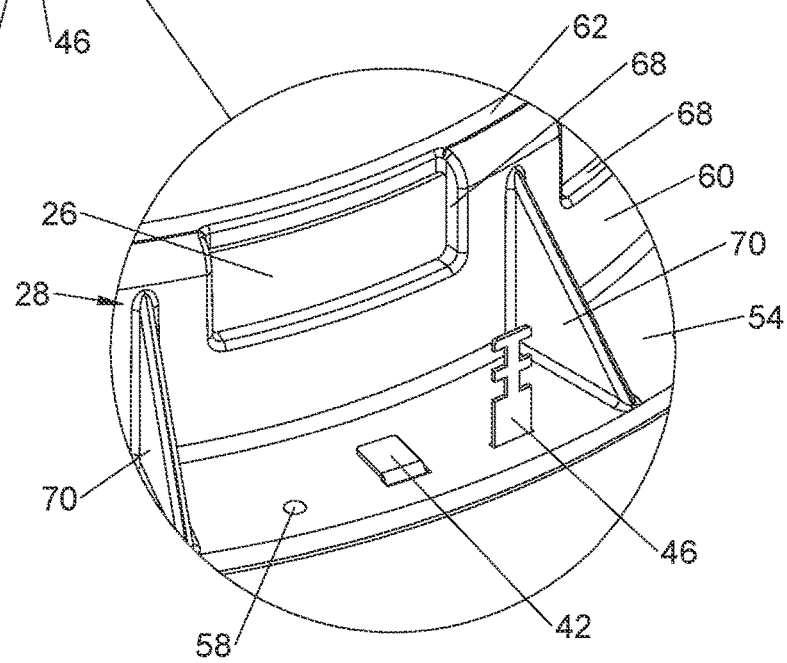

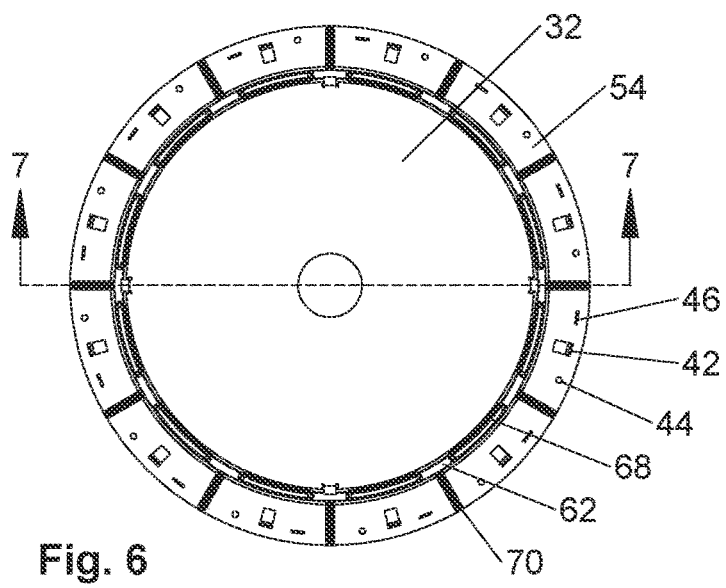
Fig. 6
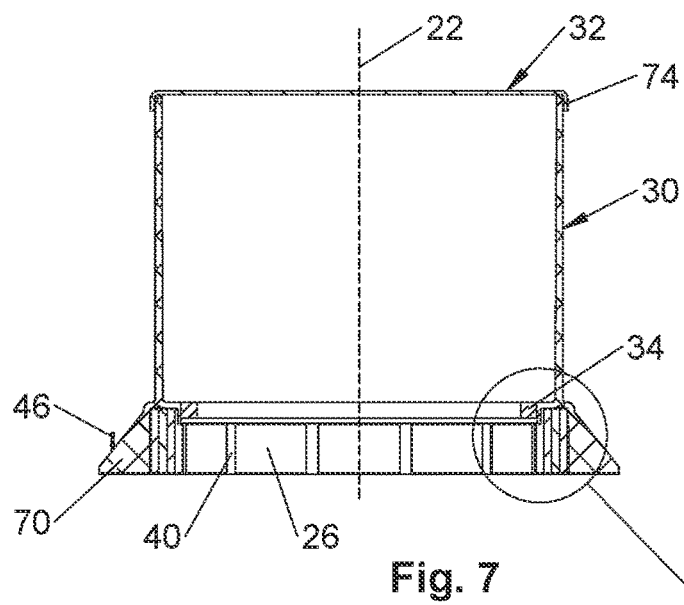
Fig. 7
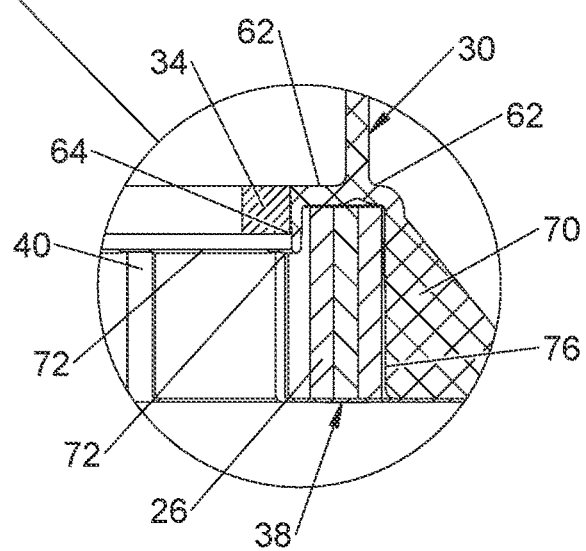

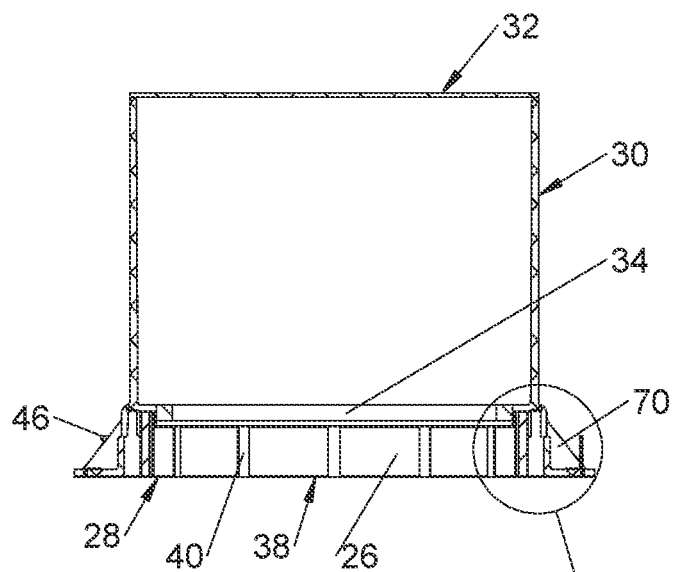
Fig. 8
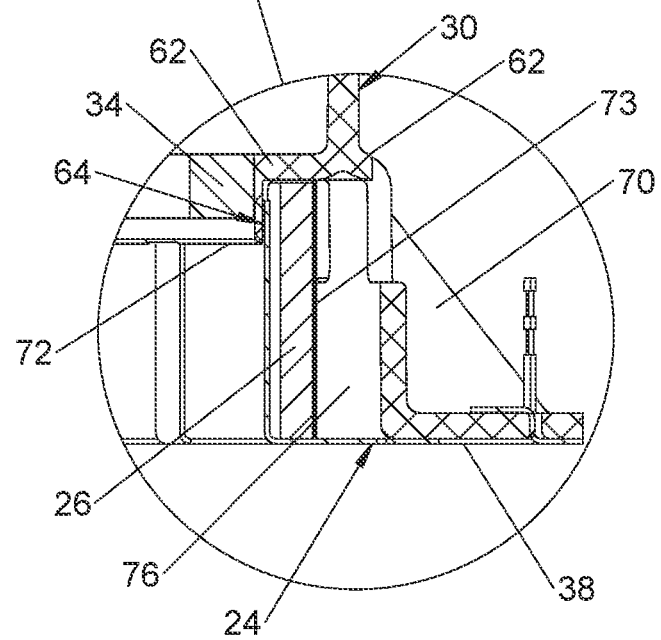

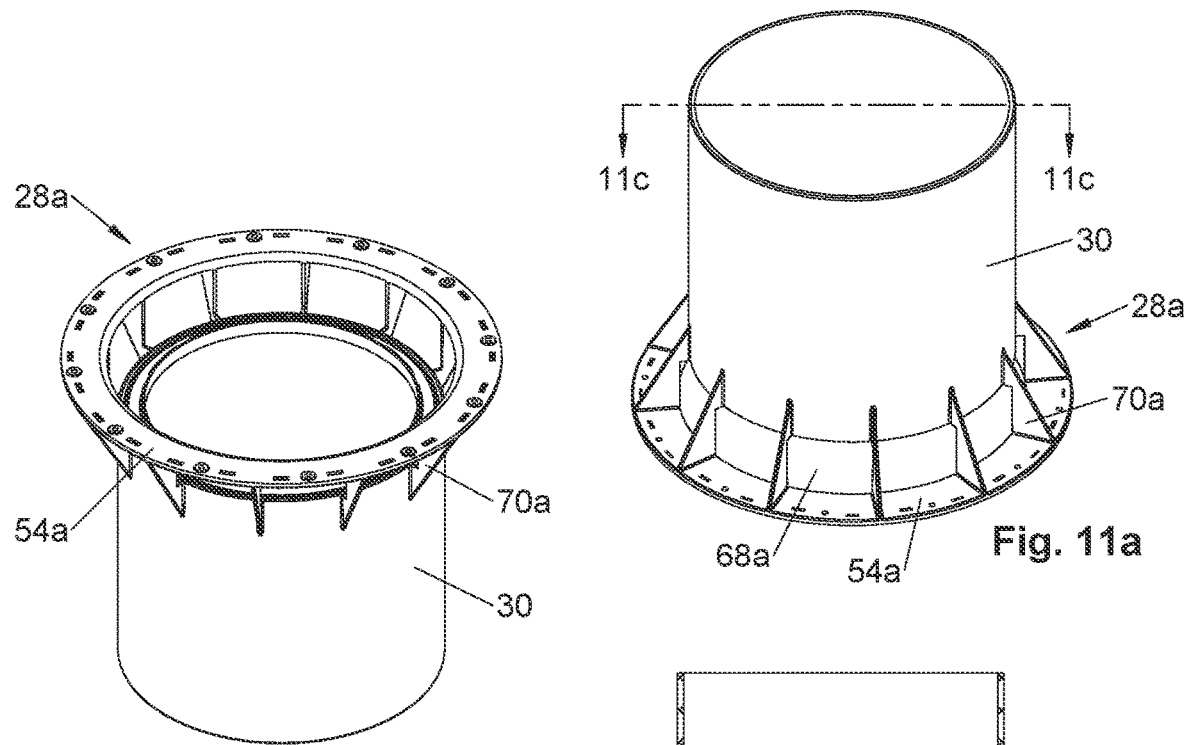
Fig. 11a
Fig. 11b
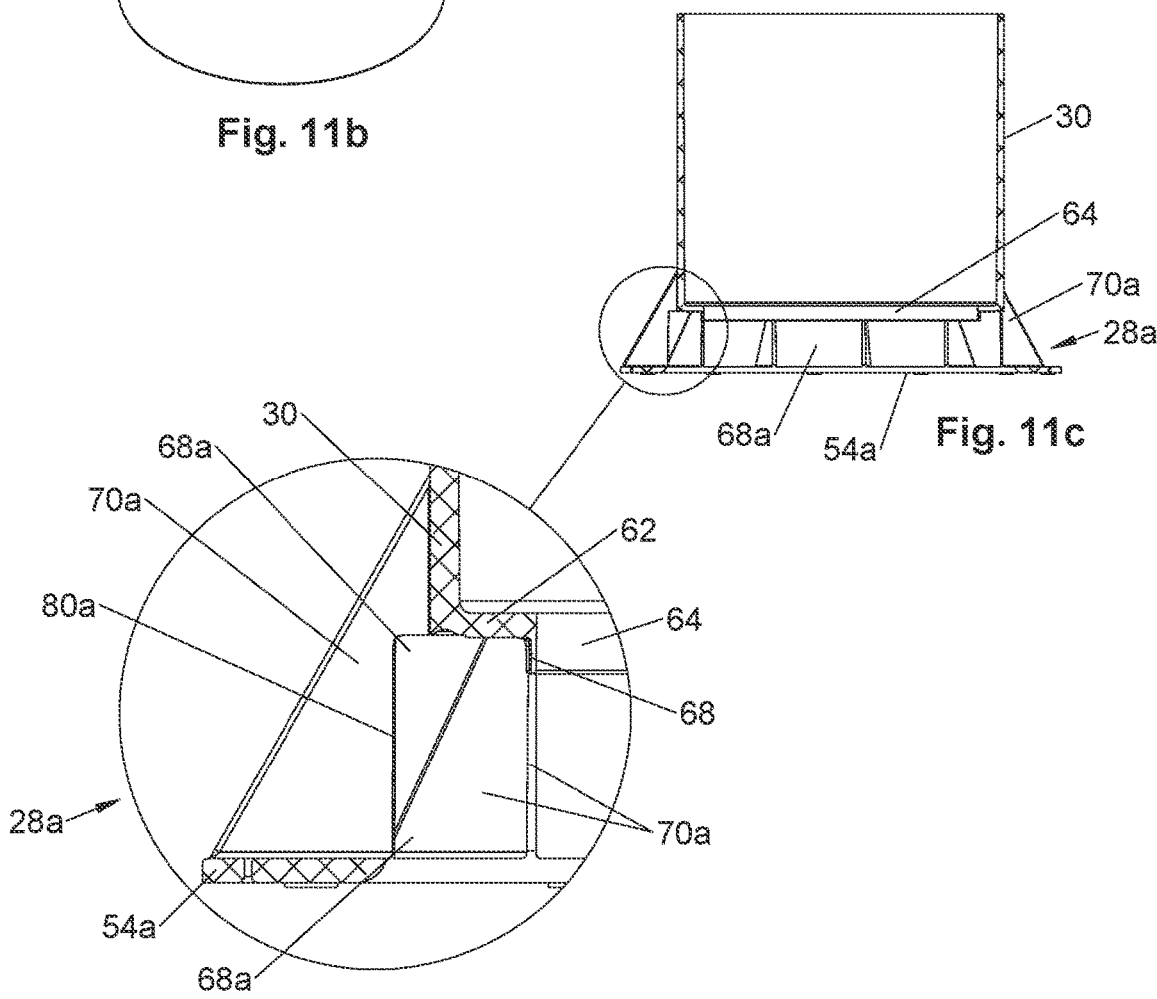
Fig. 11c

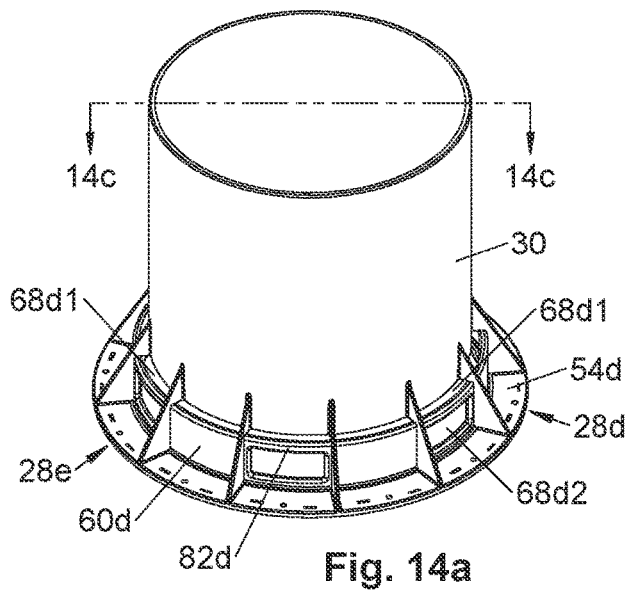
Fig. 14a
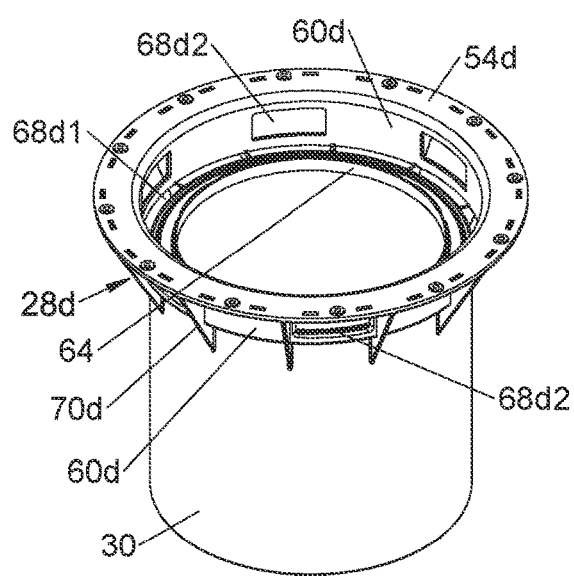
Fig. 14b
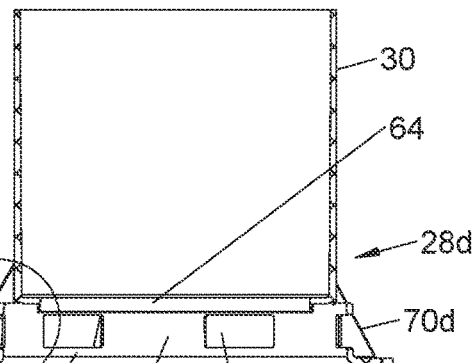
Fig. 14c
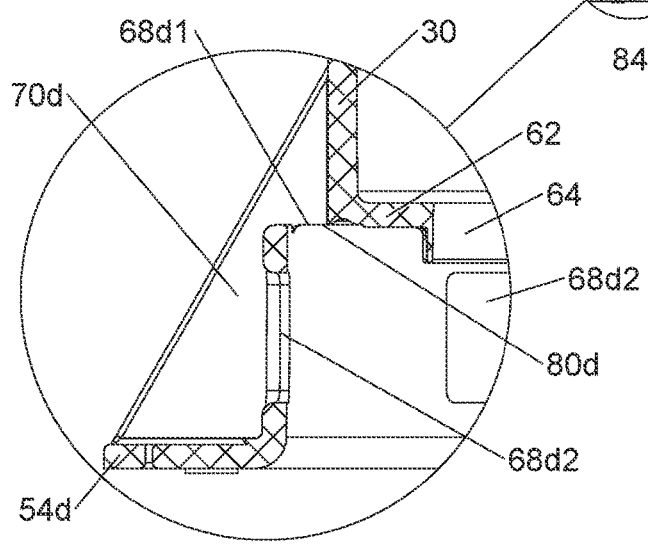

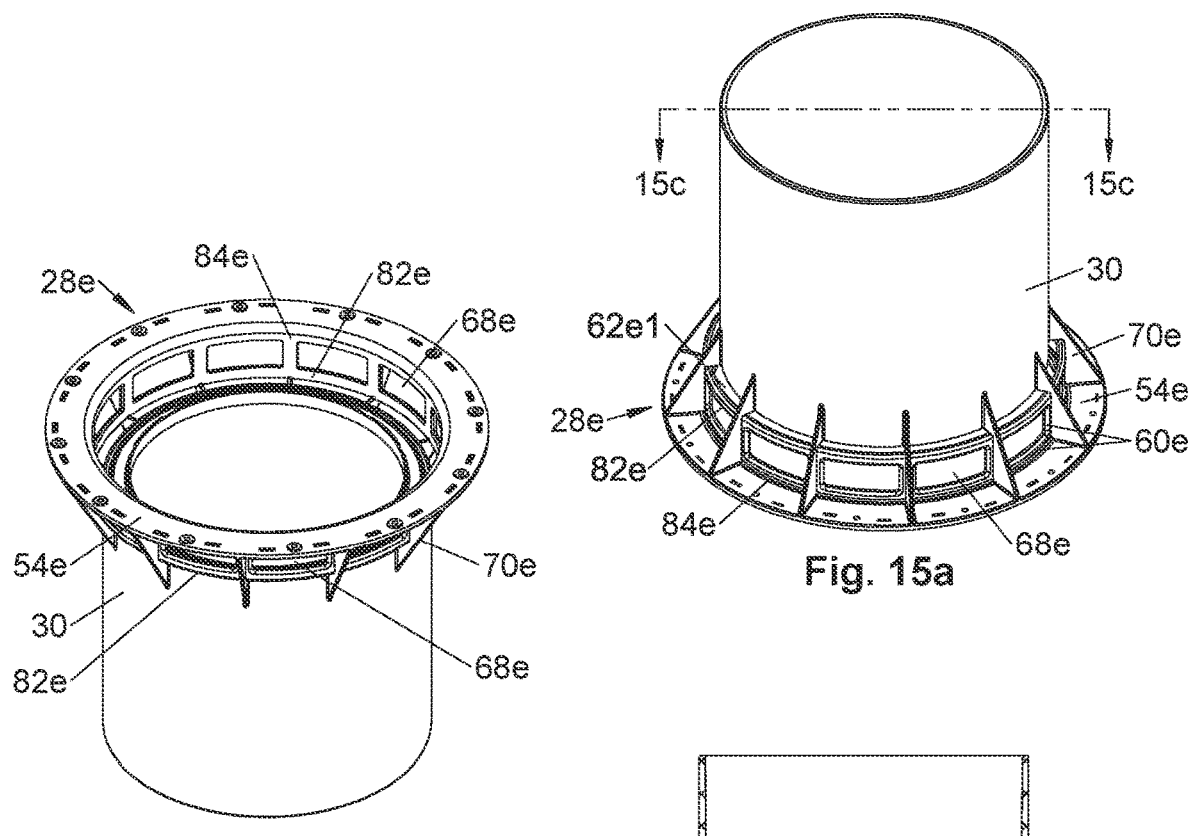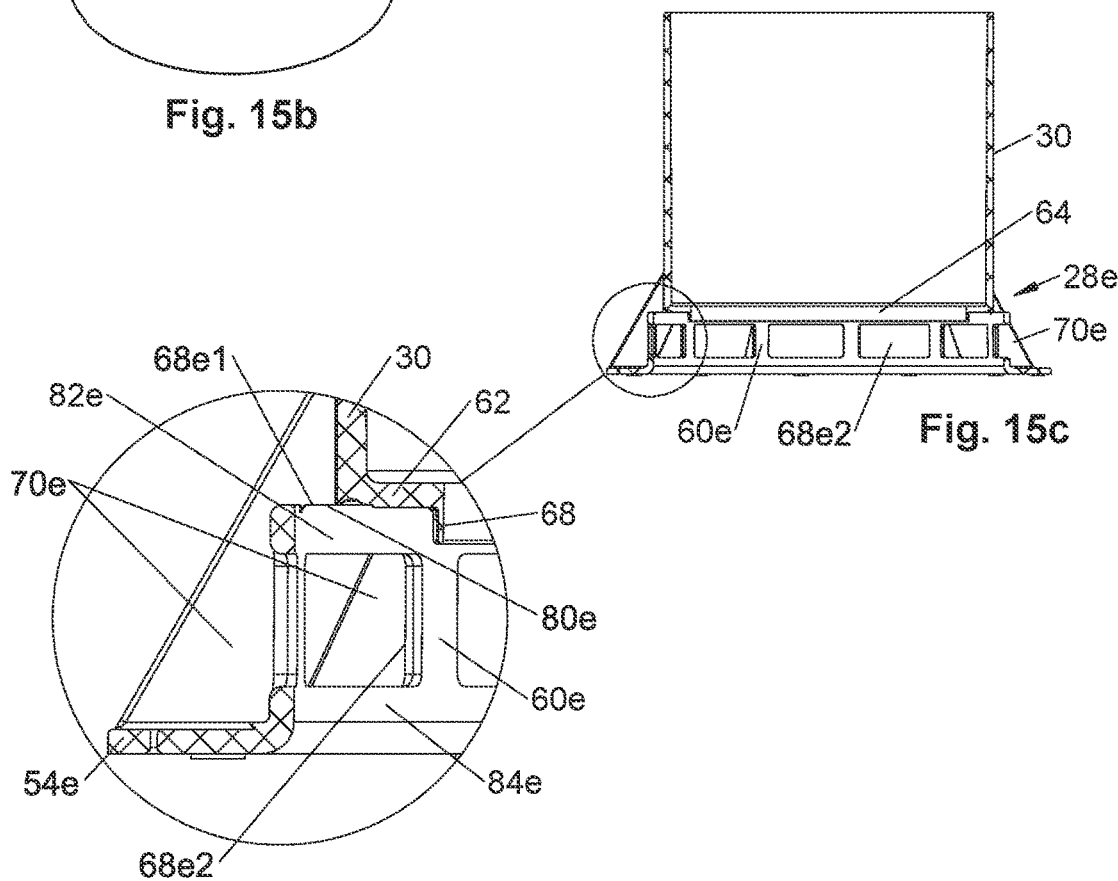

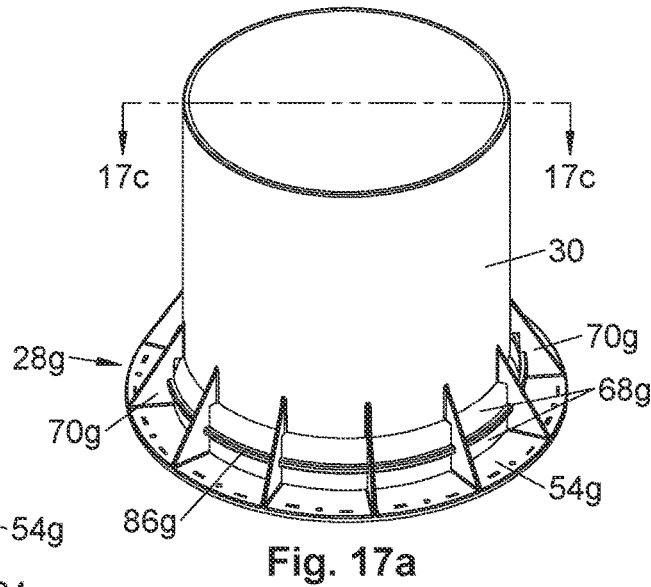
Fig. 17a
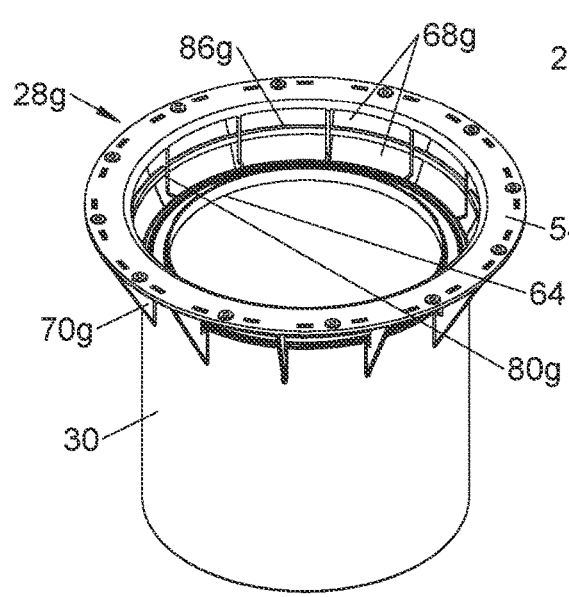
Fig. 17b
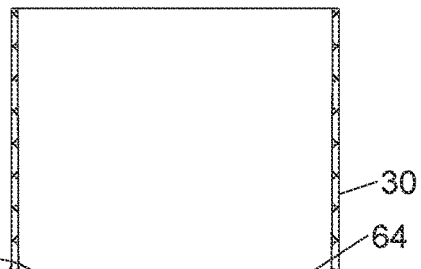
Fig. 17c
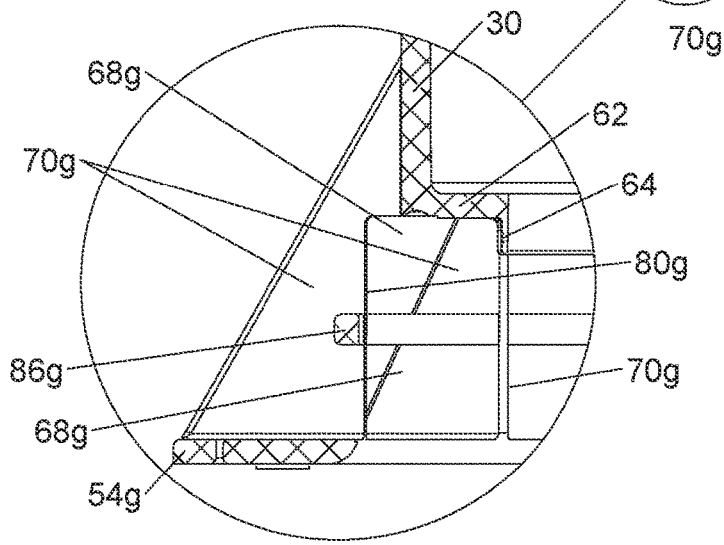

SLEEVE ASSEMBLY FOR A POURED CONCRETE DECK

CROSS-REFERENCE TO RELATED APPLICATIONS

The application claims the benefit under 35 U.S.C. § 119(e) to Provisional Patent Application No. 62/739,066 filed Sep. 28, 2018, the entire contents of which are incorporated herein by reference.

STATEMENT RE: FEDERALLY SPONSORED RESEARCH/DEVELOPMENT

Not Applicable

BACKGROUND

This application relates to sleeve assemblies used to form passages through poured concrete slabs, usually horizontal floors or decks but including vertical walls and all of which are referred to herein as "decks." Such sleeve assemblies are described in U.S. Pat. Nos. 9,086,174 and 8,272,082. Various penetrants, such as plumbing pipes, conduits, cables or wires pass through these passages. These passages are encircled by an intumescent material that expands with temperature, so the intumescent material blocks the passage during a fire to retard or prevent fire and/or smoke from passing through the passage. The intumescent material is encircled by a metal restraint to keep the intumescent material entrained within the concrete during a fire.

The intumescent material is very expensive and enough material must be provided to block the passage. If the penetrants are metal, then less intumescent material is needed because the metal occupies part of the passage throughout the fire and the fires are typically not hot enough to melt the metal. If the penetrants are combustible, such as plastic pipes that can melt or burn during a fire, so they no longer block the passage, then more intumescent material is needed to block the passage. To accommodate both metal and non-metal penetrants passing through the sleeve assemblies, manufacturers provide one set of sleeve assemblies with less intumescent material in a smaller diameter, metal retainer when the penetrants are metal, and provide a different set of sleeve assemblies with more intumescent material and a larger metal retainer when the penetrants are plastic. But that requires making different sleeve assemblies for metal and non-metal penetrants, where each assembly uses different intumescent rings and different retainers for use with the different penetrants. For smaller diameter passages an intumescent ring for a plastic penetrant may be used for a metal penetrant to avoid having to make two different sleeves, but that costs more because more intumescent material is used than needed. When the diameters of the passages become larger, such as 8 to 12-inch diameter (or larger) passages, the volumes (and cost) of the intumescent material to block those passages increases greatly, especially if the penetrant is plastic instead of metal. Similarly, the variation of inner and outer diameter diameters of the intumescent rings varies significantly on whether the penetrant is metal or plastic because the intumescent material for a plastic penetrant must block the entire passageway (e.g., a 12-inch passage) instead of simply blocking the annular space between a 12-inch diameter passage and a 10 or 11-inch diameter metal pipe. There is thus a need for a simpler method and apparatus by which a single sleeve assembly can be used for metal and plastic penetrants in order to reduce manufacturing costs for the sleeve assembly, intumescent ring and retainer, and to reduce the amount and associated cost of the intumescent material needed.

BRIEF SUMMARY

There is thus provided a sleeve assembly for creating a passage extending along a longitudinal axis through a poured concrete deck. The sleeve assembly may include a tubular sleeve extending along the longitudinal axis and having an outer diameter. The tubular sleeve may further have a lateral ledge extending inward from a bottom of the tubular sleeve to form a circular opening encircling the longitudinal axis during use. The assembly advantageously has a base flange encircling the longitudinal axis with the base flange having an inner diameter larger than the outer diameter of the tubular sleeve. A plurality of stiffeners and an optional base wall each connect the base flange to a bottom of the tubular sleeve. A ring of intumescent material is connected to a fire ring plate that is connected to the base flange so the ring of intumescent material is located below the bottom of the tubular sleeve and encircles the longitudinal axis at a location inside the stiffeners and inside the optional base wall when it is present. The stiffeners and optional base wall are configured so concrete can enter a space between the ledge and the base flange by passing through at least one of: (a) spaces between adjacent stiffeners and the intumescent ring; or (b) spaces between the base wall and the bottom of the sleeve; or (c) a plurality of open windows in the base wall facing a direction lateral to the longitudinal axis, or (d) any combination of (a) and (b) and (c).

In further variations, the assembly includes the base wall which extends along the longitudinal axis and is connected to the stiffeners. The base wall has no windows and may be low or extend to the lateral ledge, in either case forms open spaces between the stiffeners for concrete to enter beneath the sleeve. The base wall may include the laterally facing windows in the base wall, so concrete can enter the windows, and optionally enter an annular space above the windows depending on whether the ledge extends outward to connect to the top of the base wall. The windows are preferably rectangularly shaped with the longest dimension of the rectangle in the circumferential direction.

In further variations, the sleeve assembly does not include the optional base wall and poured concrete enters below the sleeve and its ledge to encircle and entrain the stiffeners, the base flange and the ring of intumescent material in concrete. The stiffeners and optional base wall may be configured so the space between the ledge and the base flange also includes a further space enclosing an outer periphery of the ring of intumescent material. Thus, concrete may abut the laterally facing periphery of the intumescent ring and/or the top of the intumescent ring at its outer peripheral corner and entrain an outer portion of the intumescent ring.

The sleeve assembly may optionally include a sheet of thin material encircling an outer periphery of the ring of intumescent material and extending between the ledge and the fire ring plate to block concrete from entering the passage. The sleeve assembly may also include a lip depending from an inner edge of the ledge and contacting the ring of intumescent material or sufficiently close to the ring of intumescent material to block concrete from flowing between the ring of intumescent material and the depending lip and into the passage when the concrete deck is poured. The intumescent material itself may contact the ledge to block the flow of concrete when the deck is poured.

In any of the variations described herein, the sleeve assembly may include a cap configured to cover a top end of the tubular sleeve to block concrete from flowing into the sleeve when the deck is poured and finished, with the cap being removed after the concrete hardens sufficiently for the cap to be removed.

In more detail, there is also provided a sleeve assembly for forming a passage extending along a longitudinal axis through a poured concrete deck. The sleeve assembly includes a fire ring having a fire ring plate with a circular opening centered about a longitudinal axis. The fire ring has a ring of intumescent material centered around that circular opening and centered on the longitudinal axis. The ring of intumescent material has a height along the longitudinal axis and a maximum radial thickness in a plane orthogonal to the longitudinal axis. The assembly also includes a tubular sleeve extending along the longitudinal axis and having an open top at one end of the tubular sleeve and a laterally extending ledge at the other end of the tubular sleeve.

A base is connected to the tubular sleeve. The base has a base flange that extends outward in a plane orthogonal to the longitudinal axis and has an inner base flange edge that defines a base opening centered on the longitudinal axis. That base opening is slightly larger than the tubular sleeve so an annular gap can be formed between the outside of the tubular sleeve and the inside of the base flange. The fire ring plate is fastened to the base flange with the ring of intumescent material extending through the base opening toward the tubular sleeve. The base may have an optional base wall extending from the inner base flange edge along the longitudinal axis in the direction of the tubular sleeve. The base may have a plurality of stiffeners extending between the base flange and at least one of the tubular sleeve, the base wall, or both the tubular sleeve and base wall. The ring of intumescent material is located laterally between the depending lip and the plurality of stiffeners and the optional base wall when present. Further, the ring of intumescent material is located vertically between the ledge and the fire ring plate.

In further variations, the ledge may have a depending lip at an inwardly extending side of the ledge with the depending lip cooperating with the ring of intumescent material to keep concrete from flowing into the passage when the concrete deck is poured. The sleeve assembly may also or alternatively have a sheet of material extending between the ledge and the base flange and encircling the longitudinal axis to keep concrete from flowing into the passage when the concrete deck is poured. The ring of intumescent material may cooperate with the ledge or the depending lip to block concrete from flowing into the passage when the concrete deck is poured, by leaving insufficient space for the concrete to flow through when it is poured. A smoke ring may optionally be connected to the depending lip with the smoke ring sized to engage an outer circumference of a tubular penetrant extending through the tubular assembly during use.

In still further variations, the assembly includes the base wall to add strength, and the ledge may extend outward from the tubular sleeve to connect to the base wall to further strengthen the base. The base wall may have a plurality of open windows extending therethrough with each open window located between two adjacent stiffeners. At least some of the open windows may further extend through a portion of the outwardly extending ledge located axially above each of the at least some of the open windows to strengthen the base while allowing windows for poured concrete to flow through when the deck is poured. Advantageously, an open window extends through the base wall between each pair of adjacent stiffeners, but the windows may be located between alternating pairs of stiffeners. In further variations, the base wall has an axial height that is below a top of the ledge. The base wall may form an annular space around the bottom of the tubular sleeve for concrete to enter during pouring of the deck. The base wall may be continuous, or it may optionally have a plurality of open windows extending therethrough with each open window located between two adjacent stiffeners, and a sill along the bottom of each window and a header along the top of each window.

In still further variations, the base wall is not present and the stiffeners that extend between the base flange and the tubular sleeve have a notch in them conforming to the shape of at least a portion of an outer periphery of the intumescent ring. An optional stiffening ring may be connected to plurality of stiffeners and encircling the longitudinal axis to provide circumferential stiffness between the adjacent stiffeners and to the base.

In still further variations, the ring of intumescent material comprises a plurality of concentric and contacting rings of intumescent material encircling a plurality of positioning tabs that extend upward from the fire ring plate around the circular opening in the fire ring plate. The radial thickness of the ring of intumescent material may vary and may be located more than 0.1 inches from an inward facing surface of each of the plurality of stiffeners in an orthogonal plane at the top of the ring of intumescent material. The material may be closer to that inward facing surface. Preferably, the assembly includes the base wall and the ring of intumescent material has an outward facing side that is located a distance from an inward facing side of the base wall, which distance is distance between 0.0 and 0.1 inches—which allows assembly but with more difficulty as the spacing decreases. The ring of intumescent material advantageously has an outward facing side that is spaced from an inward facing side of the base wall a distance sufficient to create an annular void space opening onto the plurality of open windows so poured concrete can fill the void space when the deck is poured.

The ring of intumescent material may comprise one ring of intumescent material around a plurality of positioning tabs extending upward from the fire ring plate around the circular opening in the fire ring plate. The one ring of intumescent material is believed suitable for use with penetrants made of metal that will not melt during a fire, so the intumescent material need not expand to the longitudinal axis during a fire and need only expand to seal against the metal penetrant. The one strip of intumescent material may have a radial thickness less than a radial distance between the outward facing side of the ring of intumescent material and the inward facing side of one of the plurality of stiffeners in an orthogonal plane through a top of the intumescent ring. That radial thickness and radial distance prevent the stiffeners from contacting the ring of intumescent material.

The ring of intumescent material may include a plurality of concentric and contacting rings of intumescent material encircling a plurality of positioning tabs that extend upward from the fire ring plate around the circular opening in the fire ring plate. Advantageously, the plurality of rings of intumescent material extend to within 0.0 and 0.1 inches of the inward facing surface of the base wall. The multiple rings of intumescent material or the radially thicker material is believed suitable for use with plastic penetrants that melt during the fire, so the intumescent material must expand a greater distance during fires to seal the passage. A ring of intumescent having from two to five concentric rings of intumescent material is believed suitable for many applications. The concentric rings may also be stacked vertically, so for example, there may be two layers two to five concentric rings stacked vertically.

The base flange may be a continuous ring, or it may be intermittent and formed of a plurality of segments. Advantageously, each segment is connected to a bottom of at least one stiffener. Advantageously, the fire ring base has a plurality of locking tabs extending through aligned openings in the base flange to connect the fire ring to the base. Each of the sleeve assemblies may have a removable cap covering the open end of the tubular sleeve when concrete is poured to keep the concrete out of the sleeve, with the cap removed thereafter.

Any of the sleeve assemblies described herein may be entrained in concrete which extends through the plurality of open windows, or between the stiffeners and around the base flange, or between the base wall and the tubular sleeve, depending on the construction of the base wall and the possible windows. Any of the assemblies and variations described herein may include a metal penetrant extending through the tubular sleeve assembly, or a plastic penetrant extending through the tubular sleeve assembly.

As noted a sheet of material may encircle the outer periphery of the ring of intumescent material and extend between the ledge and the fire ring plate to keep concrete from entering the circular opening in the fire ring plate. That sheet of material may be used with or without the depending lip on the ledge to keep concrete from flowing into the passage when concrete is poured. That sheet of material may be used with any of the sleeve assemblies and variations described herein. Indeed, the several variations described herein may be used with each of the assemblies and other variations described herein.

There is also provided a sleeve assembly for creating a passage extending along a longitudinal axis through a poured concrete deck that includes a tubular sleeve extending along that longitudinal axis and having an outer diameter. The tubular sleeve further has a lateral ledge extending inward from a bottom of the tubular sleeve to form a circular opening encircling the longitudinal axis during use. The sleeve assembly includes a base flange encircling the longitudinal axis and having an inner diameter larger than the outer diameter of the tubular sleeve. A plurality of stiffeners connect the base flange to a bottom of the tubular sleeve with openings between a further plurality of the plurality of stiffeners allowing passage of poured concrete between adjacent struts in the radial direction.

In further variations, the sleeve assembly may include a ring of intumescent material connected to a fire ring plate that is connected to the base flange so the ring of intumescent material is located below the bottom of the tubular sleeve and encircles the longitudinal axis at a location inside the stiffeners.

In still further variations, the sleeve assembly may include a base wall connected to the base flange and the plurality of struts, the base wall reducing the passage of poured concrete between adjacent struts in the radial direction. In additional variations, the sleeve assembly may include a ring of intumescent material connected to a fire ring plate that is connected to the base flange so the ring of intumescent material is located below the bottom of the tubular sleeve and encircles the longitudinal axis at a location inside the stiffeners and base wall. Advantageously, but optionally, there are a plurality of open windows in the base wall facing a direction lateral to the longitudinal axis. Further, the base wall advantageously connects to the bottom of the tubular sleeve at intermittent locations at each strut.

BRIEF DESCRIPTION OF THE DRAWINGS

These and other advantages and features of the invention will be better appreciated in view of the following drawings and descriptions in which like numbers refer to like parts throughout, and in which:

FIG. 4 is an exploded perspective view of a sleeve of FIG. 1 on the assembled fire ring and base of FIG. 2;

FIG. 5 is a perspective view of an assembled sleeve, fire ring and base of FIG. 4, with an enlarged view of a portion of the assembly;

FIG. 6 is a top view of the assembly of FIG. 5;

FIG. 7 is a section view taken along section 7-7 of FIG. 6, with an enlarged view of a portion of that section showing a first intumescent ring;

FIG. 8 is a section view taken along section 7-7 of FIG. 6, with an enlarged view of a portion of that section showing a second intumescent ring;

FIG. 11A is a perspective view of the top of a sleeve assembly having a base with a base flange connected to the tubular sleeve by stiffeners, with no base wall on the base;

FIG. 11B is a bottom perspective view of the sleeve assembly of FIG. 11A;

FIG. 11C is a cross-sectional view taken along section 11C-11C of FIG. 11A;

FIG. 14A is a perspective view of the top of a sleeve assembly having a base with a base flange and a high base wall all connected by stiffeners to the tubular sleeve, with windows between alternating stiffeners;

FIG. 14B is a bottom perspective view of the sleeve assembly of FIG. 14A;

FIG. 14C is a cross-sectional view taken along section 14C-14C of FIG. 14A;

FIG. 15A is a perspective view of the top of a sleeve assembly having a base with a base flange and a high base wall all connected by stiffeners to the tubular sleeve, with windows between each of the stiffeners;

FIG. 15B is a bottom perspective view of the sleeve assembly of FIG. 15A;

FIG. 15C is a cross-sectional view taken along section 15C-15C of FIG. 15A;

FIG. 17A is a perspective view of the top of a sleeve assembly having a base with a base flange connected by stiffeners to the tubular sleeve, with no base wall and with a stiffening ring connecting the stiffeners intermediate the base flange and the tubular sleeve;

FIG. 17B is a perspective view of the bottom of the sleeve of FIG. 17A; and

FIG. 17C is a cross-sectional view taken along section 17C-17C of FIG. 17A, with one corner of the cross-sectional view shown in an enlarged illustration.

DETAILED DESCRIPTION

Figure 1:
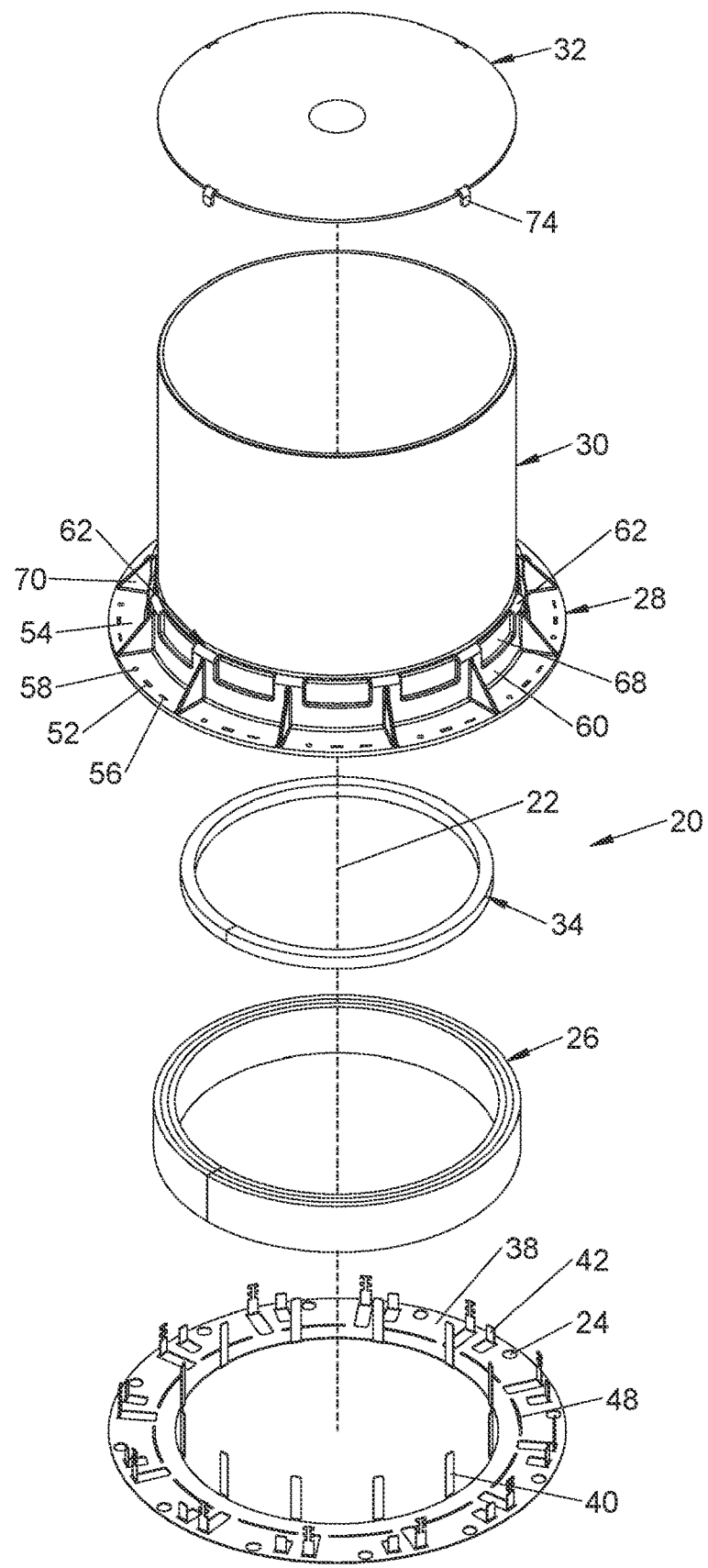
FIG. 1 is an exploded perspective view of a sleeve assembly with a cap.

As used herein, the relative directions inward and outward are with respect to the longitudinal axis 22, with inward being toward the axis and outward being away from the axis. The relative directions up and down, above and below, top and bottom, are with respect to directions along the longitudinal axis when that axis is vertical, as shown in FIG. 1. As used herein, a majority or a major portion means over 50% while a substantial portion means more than 90%.

Referring to FIGS. 1-10, and especially to FIG. 1, a sleeve assembly 20 extends along longitudinal axis 22. The sleeve assembly includes a fire ring 24 which holds an intumescent ring 26 in a base 28 of tubular sleeve 30 having a distal end that is removably and optionally covered by cap 32. A smoke ring 34 is optionally placed inside the sleeve assembly 20, preferably inside the base 28.

Figure 2:
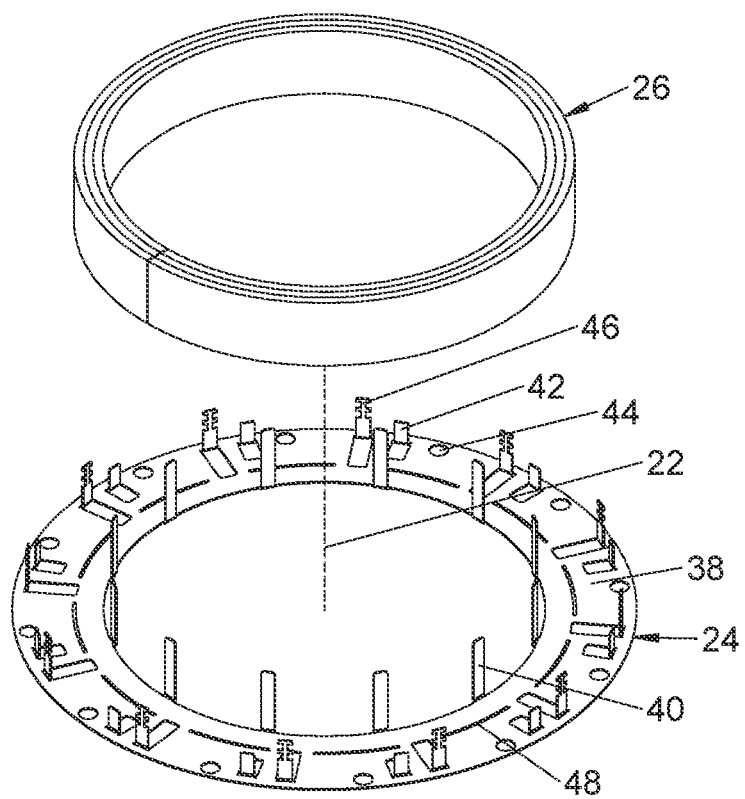
FIG. 2 is an exploded perspective view of a fire ring and an intumescent ring of FIG. 1.
Figure 3:
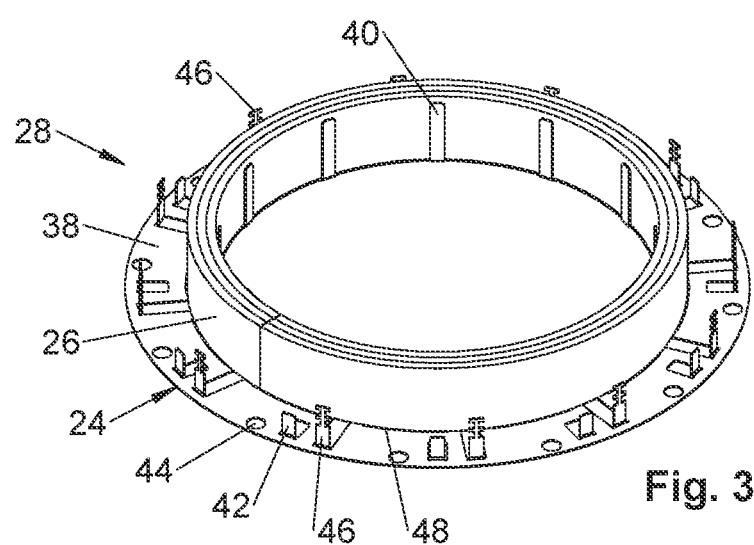
FIG. 3 is an assembled view of the intumescent ring and fire ring of FIG. 2.

As best seen in FIGS. 1-3, the fire ring 24 is shown as an annular metal plate 38 having an inner and outer diameter with the inner diameter slightly larger than the nominal diameter of the passage through the sleeve assembly 20. As used herein, slightly larger means 3% to 20% larger than the smaller dimension, and preferably 5% to 10% larger than the smaller dimension. Thus, if the nominal diameter of the passage is 12 inches, the inner diameter of the opening in the annular metal plate 38 that is 5% larger is preferably about 0.05×12 inches=12.6 inches. The plate 38 extends in a plane orthogonal to axis 22 and has a plurality of positioning tabs 40 extending from the inner edge of the circular opening in the plate 38 and fire ring 24. The positioning tabs 40 extend along the longitudinal axis 22 and preferably toward the cap 32 and establish the inward location of the intumescent ring 26 during use, but not during fires. The positioning tabs 40 are usually thin, flat strips of metal having a rectangular cross-section so the positioning tabs bend easily toward the axis 22. The positioning tabs 40 are usually, but optionally, equally spaced around the inner opening of the fire ring, with a spacing of an inch or two between each adjacent positioning tab. As the size of the fire ring 24 and plate 38 can vary, the number of positioning tabs will also vary. The positioning tabs 40 are advantageously long enough to extend along the axial length or height of the intumescent ring 26 but advantageously do not extend much beyond the intumescent ring. The intumescent ring 26 fits over the positioning tabs 40 and advantageously contacts the outer facing surface of the positioning tabs so the tabs center the intumescent ring about the circular opening in the fire ring 24. Advantageously, the positioning tabs 40 are long enough to fit inside a depending lip 64 described later.

The fire ring 24 also has a series of locking tabs 42 that extend upward parallel to axis 22. The locking tabs 42 are periodically spaced around the axis 22. The locking tabs are advantageously punched out of the metal plate 38 and have a thin, rectangular cross-section. Each locking tab 42 fits through a mating opening in the base 28 to connect the fire ring 24 to the base 28. Advantageously, on the clockwise side of each locking tab 42 (looking from the cap 32 toward the fire ring 24) is a fastener hole 44 sized so a fastener can fasten the plate 38 to a concrete form, such as a sheet of plywood or a larger base for connection to a corrugated metal form.

Advantageously, on the counter-clockwise side of each locking tab 42 is an entrainment tab 46 that is advantageously punched out of the metal plate 38 to have a thin, rectangular cross-section and that extends parallel to the axis 22. The locking tab 42 has a distal end that is contoured for entrainment in concrete so as to resist removal from concrete when pulled along the length of the entrainment tab after the concrete hardens. The contoured end is shown as having two cross-members each perpendicular to the length of the entrainment tab 42. The entrainment tab 46 fits through a mating opening in the base 28 and extends beyond that base 28 in order to better entrain the base and fire ring in the fluid concrete that is poured around the sleeve assembly 20 during installation and that hardens for long-term use.

The plate 38 also has a series of curved vent slots 48 encircling the central opening in the plate 38 and located adjacent to that central opening and the positioning tabs. When the intumescent ring 26 is placed on the fire ring 24, the vent slots are advantageously on the outer edge or outer side of the fire ring as seen in FIG. 3 so that hot gases may travel upward through the vent slots 48 to heat the intumescent ring 26 during a fire.

The intumescent ring 26 may be formed of any suitable intumescent material, including annular rings of predetermined inner and outer diameter, or other configurations. The intumescent material is typically sold in strips of fixed width and is cut to length as needed. An intumescent ring 26 formed of multiple concentric strips of intumescent material is believed suitable and is shown in the Figures. Three concentric rings are shown in FIGS. 2-3, with the inner ring encircling and advantageously wound around the positioning tabs 40, and the outer ring of intumescent material ending just inside the outer portion of the vent slot 48. From two to five concentric rings of intumescent material are believed suitable. The concentric rings may be stacked vertically. Two stacked rings of two to five rings of intumescent material are believed suitable for most applications involving passages about 10 to 12 inches in diameter. Advantageously, the axial length or height of the intumescent ring 26 is about the same as the axial length of the positioning tabs 40 to hold the intumescent material out of contact with the penetrating objects such as pipes, etc. that pass through the sleeve assembly 20 when it is entrained in fluid concrete to form a poured and hardened concrete deck. If concentric rings of intumescent material are stacked vertically, the axial length of the positioning tabs 40 may not extend beyond the axial length of one layer of concentric rings, but preferably extends to the full axial length of the stacked concentric rings.

Referring to FIGS. 4-5, the assembly of the fire ring 24 and intumescent ring 26 is fastened to the base 28 of the tubular sleeve 30 by passing the locking tabs 42 and entrainment tabs 46 through corresponding lock tab openings 52 and entrainment tab openings 56 formed in the base 28, preferably formed in an outward extending flange 54 of the base. The base flange 54 is preferably orthogonal to longitudinal axis 22. The locking tabs 42 are bent over an exterior surface of the base flange 54 to connect the fire ring 24 to the base 28. Advantageously, the locking tabs 42 extend around the fire ring 24 and thus connect to the base 28 around the entire circumference of the base 28. The entrainment tabs 46 extend above the base flange 54 to engage the concrete and interlock the fire ring 24 and base 28 to the fluid concrete poured around the sleeve assembly 20. A plurality of fastener openings 58 are located to coincide with fastener hole 44 so fasteners (e.g., nails, threaded fasteners) can pass through aligned openings 58, 44 to fasten the base 28 and fire ring 24 to the concrete support surface such as a plywood deck or a baseplate for the assembly 20, or to a corrugated support. As indicated, the openings 56, 52, 58 in base flange 54 are axially aligned with the entrainment tabs 46, locking tabs 42 and fastener holes 44, respectively, around a circumference of the fire ring 24 and base 28.

Referring to FIGS. 4-7, the base 54 may have various configurations but advantageously has a short, preferably tubular base wall 60 extending from the base flange 54 along the longitudinal axis 22. The base wall 60 encircles and is advantageously centered on longitudinal axis 22. The base wall 60 is preferably slightly larger in diameter than the tubular sleeve 30 to form a laterally extending ledge 62 located at the top of the base wall and preferably extending inward toward axis 22. The ledge 62 advantageously has a depending lip 64 extending downward toward the plane of the base flange 54 and forming a short, cylindrical flange. The depending lip 64 is spaced from the base wall 60 a distance sufficient to accommodate the radial thickness of the intumescent ring 26, and in some cases greater than that, when the fire ring 24 is connected to the base 28. The ledge 62 is located high enough along axis 22 to accommodate the axial length or height of the intumescent ring 26 when the fire ring 24 is connected to the base 28. The positioning tabs 40 advantageously end at or slightly below the bottom end of the depending lip 64. Optionally, the top ends of positioning tabs 40 may overlap the inside of the depending lip 64, but that requires a tighter alignment to fit the intumescent ring 26 and positioning tabs 40 into the partial recess formed by the depending lip 64, ledge 62 and base wall 60. Advantageously, the intumescent ring 26 nests into that partial recess so the top of the intumescent ring is immediately adjacent the laterally extending ledge 62 and restrained from movement in the radial direction by the depending lip 64 and the base wall 60 when the fire ring 24 is connected to the base 28.

Still referring to FIGS. 4-7, the tubular sleeve 30 joins the ledge 62 between the depending lip 64 and the base wall 60, preferably closer to the base wall 60. A plurality of openings or open windows 68 extend through the base wall 60 and provide access to the space below the ledge 62 and the intumescent ring 26. The open windows 68 are spaced periodically around the outer periphery of the base wall 60 and are preferably located at the top of the base wall and extend into an outer portion of the ledge 62 but advantageously do not extend into or thorough tubular sleeve 30. Thus, the open windows 68 provide access to the space below the lateral ledge 62 on the inside of the base wall 60.

The windows 68 are optionally, but preferably generally rectangular in shape, recognizing that the windows are formed in a curved base wall 60 and are thus curved, with an open top extending through that portion of the ledge 62 located radially outward of the tubular sleeve 30—and the reference to rectangular windows herein includes that curved shape. In the depicted embodiment of FIGS. 1-10, the open windows 68 are formed in an outer wall 60 that extends continuously around the longitudinal axis 22 below the windows, with the outer wall 60 extending intermittently around that axis where the windows 68 are located. The open windows 68 may extend less than half the axial length or axial height of the intumescent ring 26, or may extend more than half the axial length of the intumescent ring and in either case the intumescent ring is visible to the eye through the windows. It is believed advantageous to have the open windows 68 extend along a substantial portion of the axial length or height of the intumescent ring 26, and preferably to extend from (and through) the ledge 62 to the base flange 54 (but not through the base flange.

Advantageously, but optionally, a stiffener 70 extends between the base wall 60 and the base flange 54 at periodic locations around the base 28 to strengthen the tubular sleeve 30 and base 28 in axial compression and bending. Where the outer wall 60 is intermittent so the open windows 68 extend through the base flange 54 and the windows are separated by longitudinally extending legs 66, the stiffeners 70 support and stabilize the segment of the base flange 54 to which each stiffener is connected.

Advantageously, each stiffener 70 forms a triangular-shaped plate extending outward from the bottom end of the base, extending between the outer wall 60 and base flange 54, or the legs 66 forming the intermittent outer wall and the intermittent base flange. The stiffeners are preferably aligned in radial planes through longitudinal axis 22. Preferably, a stiffening plate 70 is located between each adjacent open window 68. Thus, the windows and stiffening plates alternate around the circumference of the base 28. The stiffeners 70 may be single plates as shown in FIGS. 1-10, or pairs of spaced-apart plates on each stiffener, or stiffeners with open cross-sections that open upward to better avoid concrete voids such as an open U-shaped cross-section opening upwards. Where the windows 68 extend through the bottom end of the outer wall 60 to form legs 66, a stiffener 70 advantageously extends between the intermittent outer wall 60 and the intermittent base flange 54 at each circumferential side of a leg 66 to form an enlarged foot on the bottom end of the leg, to provide a more stable support for the base 28 and tubular sleeve 30. Advantageously, the base flange 54 extends circumferentially across the bottom end of each leg 66 to connect to the fire ring 24, as by threaded fasteners. Other configurations of the legs 66 and stiffeners 70 may be used, with the legs extending outward at the bottom end of the base 28.

The stiffeners 70 help offset the strength lost by removing material to form the open windows 68, especially when the axial length of the windows exceeds half the axial height of the outer wall 60. The stiffening plates 70 and feet not only increase the axial and bending strength of the sleeve assembly 20, but when entrained in concrete they also resist rotation of the base 28 and tubular sleeve 30 about the axis 22. The use of open windows 68 extending axially to or through the base flange 54 and the use of legs 66 and stiffeners 70 to define those windows 68, provide a larger area for wet concrete to enter the area outside of the intumescent ring 26 and for air to escape the area below the lateral ledge 62 than does the configuration which has a shorter axial length of the open windows 68.

While wet concrete enters the open windows 68 when the concrete deck is poured, it is not desirable to have the concrete enter the inside of the sleeve assembly 20 where it could block the passage through the sleeve assembly or break part of the sleeve assembly when the hardened concrete is removed.

Figure 10:
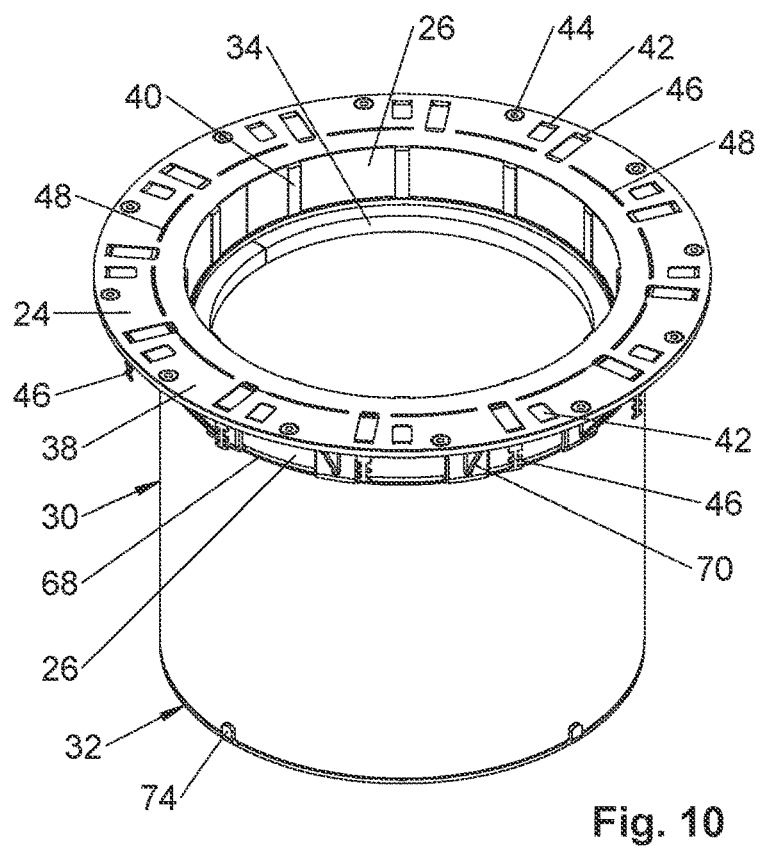
FIG. 10 is a perspective view of the bottom of the assembly of FIG. 10.

Referring to FIGS. 7-8 and 10, a smoke ring 34 is connected to the depending lip 64 to provide a smoke seal between the sleeve assembly 20 and a tube passing through the assembly 20. Frequently, a single tube passes through the sleeve assembly 20 and various cables, pipes, wires etc. pass through that tube. The smoke ring 34 is a compressible ring that seals the space between the inside of the sleeve assembly and the penetrating tube. The smoke ring 34 helps block the passage of smoke between the smoke ring and the pipe or conduit passing through the sleeve assembly 20—until the intumescent ring 26 can expand. A smoke ring 34 made of a polymer or elastomeric material is believed suitable, with polystyrene, polypropylene and polyurethane believed to be suitable materials.

The smoke ring 34 may be positioned at various locations inside the sleeve 30 and base 28 but is preferably located at the depending lip 64, in part because that is the closest part of the sleeve assembly to the longitudinal axis 22 and thus the radial length of the smoke ring 34 is smaller than if the smoke ring were located elsewhere. The smoke ring 34 is shown as comprising an annular ring centered about axis 22 during use, and having a square cross-section. The cross-sectional shape will usually become more rectangular as the outer diameter of the penetrating tube becomes smaller than the diameter of the depending lip 64. The smoke ring 34 advantageously has an adhesive on its outer surface so it adheres to the inward facing side of depending lip 64. The adhesive could be on the depending lip 64. An optional retaining lip 72 (FIGS. 7, 8) extending radially inward may be provided on the top or bottom of the downwardly extending lip 64 to restrain axial motion of the smoke ring 34 in one direction. If desired, a retaining lip 72 may be located at the top and bottom of the depending lip 64 to restrain axial motion of the smoke ring 34 in two directions along axis 22, but that makes it more difficult to insert the smoke ring between the lips.

Figure 9:
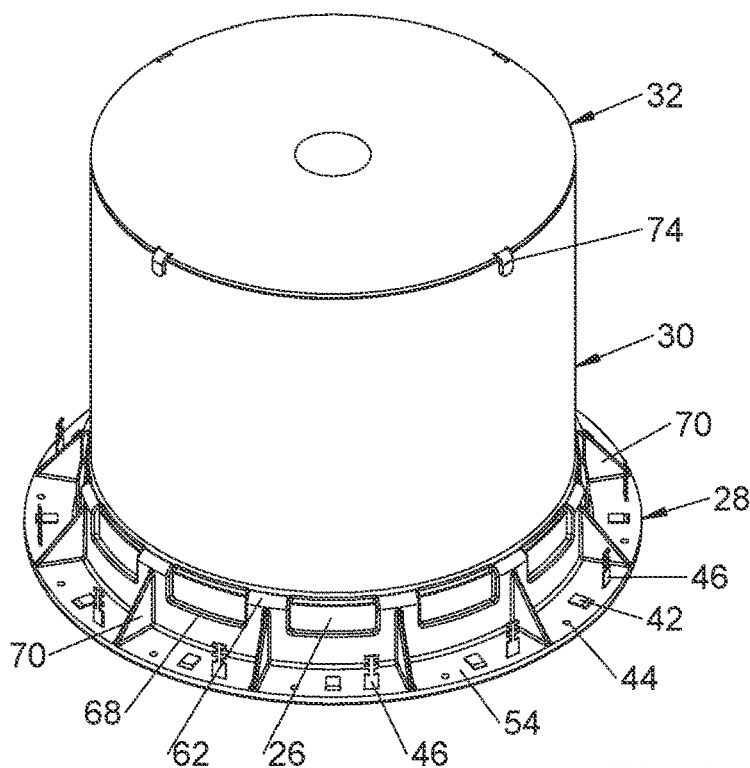
FIG. 9 is a perspective view of the top of the assembly of FIG. 5, with a cap on the sleeve.

Referring to FIGS. 1 and 9, a cap 32 may be releasably connected to the top end of the tubular sleeve 30. The cap 32 is shown as a flat disk with depending latches 74 that frictionally engage the outer surface of the tubular sleeve 30, although the latches 74 could engage the inner surface of the tubular sleeve 30. But other configurations of the cap 32 could be used and other releasable connecting mechanisms could be used, including mating threads on the cap and tubular sleeve 30, or overlapping flanges on the mating parts, or latches on one part and catches on the other mating part to form snap lock fittings. The cap 32 covers the open top of the tubular sleeve 30 when fluid concrete is poured over and around the sleeve assembly 20 to embed it in concrete, with the cap 32 removed after the concrete hardens so that penetrants can pass through the passageway in the concrete deck formed by the tubular sleeve 30 and base 28. The cap 32 keeps the concrete from entering the inside of the sleeve assembly 20 from the top of the tubular sleeve.

Referring to FIGS. 7 and 8, the space below the lateral ledge 62 and partially bounded by the depending lip 64, positioning tabs 40, base wall 60 and fire ring plate 38 contains the intumescent ring 26. As seen in FIG. 7, the intumescent ring 26 that space may include one or more concentric rings of intumescent material to form the intumescent ring 26 of relatively large radial thickness and filling all or substantially all of that annular space bounded by parts 38, 40, 60, 62, and 64. Alternatively, as shown in FIG. 8, that space bounded by parts 38, 40, 60, 62 and 64 may contain a single ring 26 of intumescent material having a much smaller radial thickness than shown in FIG. 7 and leaving an annular void space 76 between the outer facing side of the intumescent ring 26 and the adjacent and facing base wall 60 (and the ledge 62 and fire ring plate 38).

The open windows 68 open onto this void space 76 and are large enough to allow wet concrete to enter the void space through the open windows. The windows 68 advantageously extend into the outer portion of the lateral ledge 62 to form a top air vent so that air can flow freely upward during concrete pouring and thus reduce air bubbles forming and being trapped in the wet concrete in the void space 76. The depicted and described windows 68 are believed to reduce or entirely eliminate the formation of bubbles in the void space 76 when used with the described concrete. The windows 68 are advantageously 1-2 inches in circumferential length and 0.5 to 1 inch high so they are at least 2 times larger than the aggregate used in the poured fluid concrete, preferably 5 times larger and more preferably greater than 5 times larger than the aggregate used in the poured fluid concrete.

The vent slots 48 advantageously open just radially inside the base wall 60 so that if the void space 76 is filled with intumescent material from intumescent ring 26, then smoke from a fire can pass through the vent slots 48 to heat the intumescent material. If the void space 76 is filled with concrete, then the concrete blocks the smoke passage through the vent slots 48.

If the void space 76 is not filled, the intumescent ring 26 must expand outward during a fire to fill this void space and that reduces the inward expansion of the intumescent material. By filling the void space 76 with concrete, the intumescent material expands inward more efficiently. By allowing one configuration of the base 28 to accommodate intumescent rings 26 that are both radially thick and radially thin, the number of parts that need to be made and stocked for different sizes of intumescent rings is greatly reduced. One sleeve assembly 20 may be used for intumescent rings 26 of varying radial dimensions. Further, the concrete passing through the windows 68 and into the annular void space 76 entrains the base 28 in the concrete and provides a stable and strong ring of concrete surrounding the outer periphery of the intumescent ring 26 against which the intumescent material may push as it expands inward toward axis 22 under the high temperatures that can arise during a fire.

Referring to FIGS. 11-17, additional variations of the sleeve assembly are provided which show different configurations of the windows 68 and different arrangements of the base 28. These further variations have many parts previously described and those part numbers do not change (e.g., ledge 62, tubular sleeve 30), and have many parts not labeled (e.g., fastener hole 44, and tabs 42, 46 and fire ring plate 38). There are also several parts that change, and those parts are given suffix letters a through g, for each variation, as will become apparent in FIGS. 11-17. Thus, for example, stiffener 70 may be 70a, 70b, 70c, 70d, 70e, 70f or 70g, varying with each set of figures for each variation of the base 28a through 28g. Also, the open windows 68 have a vertical window opening 681 and a lateral or side opening component 682. Further, the term "open window" is used to emphasize that the windows form openings. That nomenclature becomes cumbersome so in the following description the "open window" is shortened to "window" but they both mean an open window extending through the base wall 60.

FIGS. 11A-11C show the base 28a as having no base wall 60 with the sleeve 30 connected to a flat, annular base flange 54a by stiffeners 70a. The space between the stiffeners 70a form windows 68*a* opening vertically and laterally and allowing access to the inside of the base 28*a*. The base flange 54*a* is preferably a flat, annular ring so the fire ring plate 38 is supported around a substantial majority of the circumference of the plate 38 by the flange 54*a*. The base flange 54*a* advantageously has an inner diameter larger than the outer diameter of the tubular sleeve 30, to provide a more stable support for the tubular sleeve. Each stiffener 70*a* may take the form of a triangular plate in a radial plane with a bottom on the base flange 54*a* and a top connecting to the tubular sleeve 30 at the bottom of the tubular sleeve 30. Advantageously, each stiffener 70*a* has an inverted, L-shaped notch 80*a* on the inside of each stiffener with the short leg of the L-shaped notch in the plane of the bottom of the ledge 62 and the long leg generally parallel to longitudinal axis 22. The L-shaped notches 80*a* circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80*a*, and has a generally vertical and circular outer wall circumscribed by the long leg of the inverted L-shaped notch 80*a*. The absence of base wall 60 allows concrete to more readily enter the space below the tubular sleeve 30 and outside the intumescent ring 26. The absence of a base wall 60 allows air to vent upward which avoids unintentional voids in the concrete inside the base 28*a*. The construction is believed to provide for more complete concrete encasement of the sleeve assembly and the intumescent ring. The base flange 54*a* provides support and protection for the thin fire ring plate 38 as the concrete is poured.

Figure 12A:
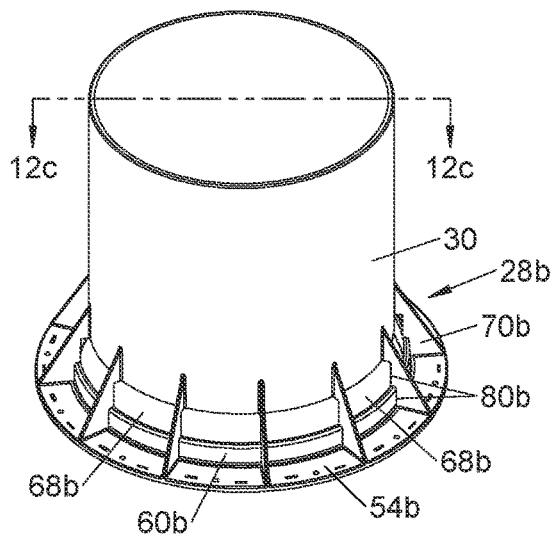
FIG. 12A is a perspective view of the top of a sleeve assembly having a base with a base flange and a short base wall all connected by stiffeners to the tubular sleeve.
Figure 12B:
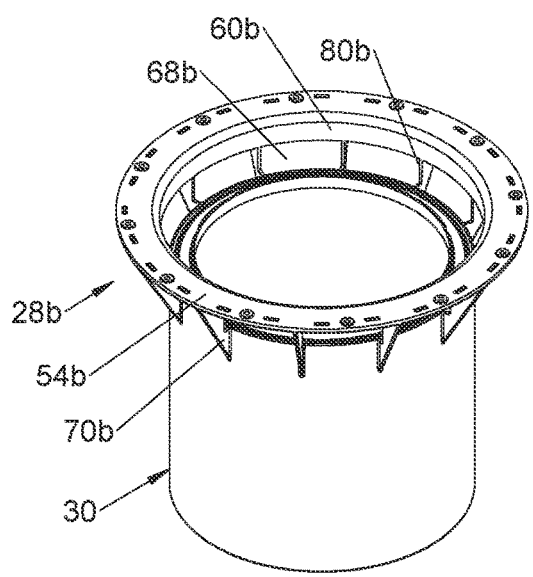
FIG. 12B is a bottom perspective view of the sleeve assembly of FIG. 12A.
Figure 12C:
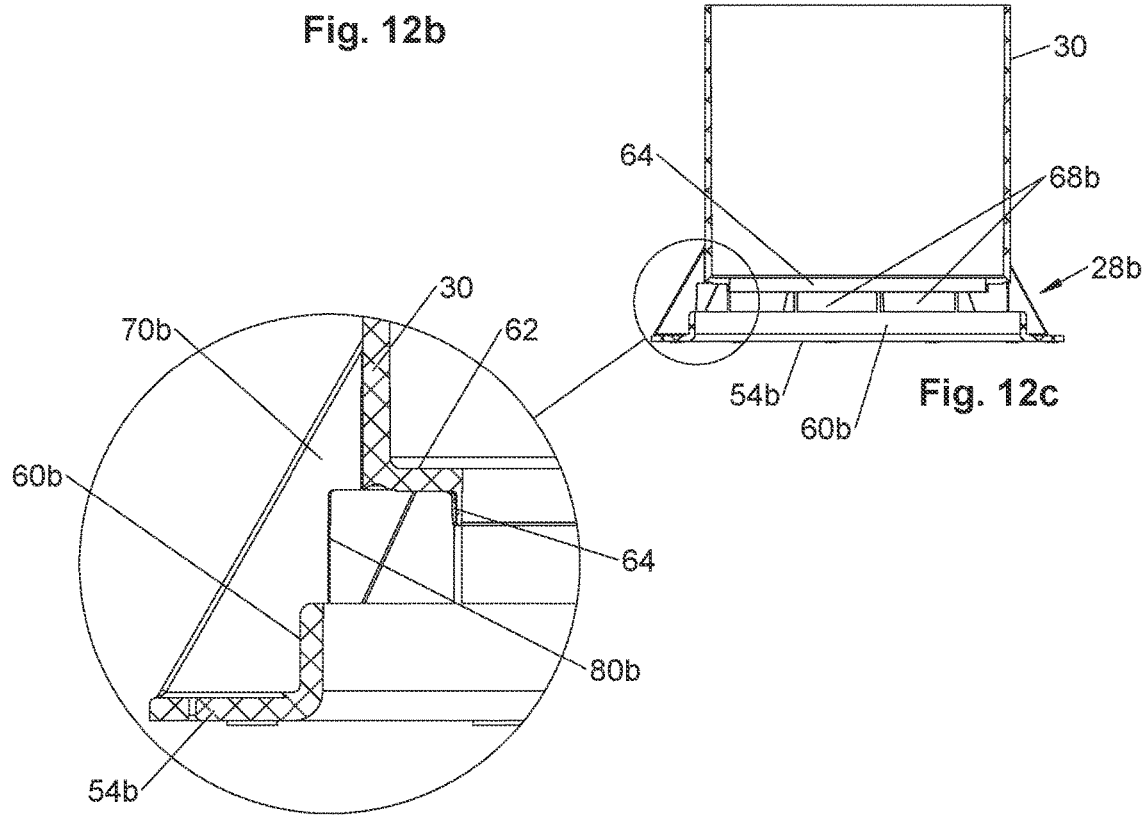
FIG. 12C is a cross-sectional view taken along section 12C-12C of FIG. 12A.

FIGS. 12A-12C show the annular base 28*b* as having a short base wall 60*b* extending about half way up the distance between the top of base flange 54 and the bottom of the ledge 62. The tubular sleeve 30 is connected to a flat, annular base flange 54*b* and to the short base wall 60*b* by stiffeners 70*b* that preferably extend in radial planes through longitudinal axis 22. The space between the stiffeners 70*b* and above the short base wall 60*b* form windows 68*b* having both vertical access and lateral, side access to the inside of the base 28*b*. The base flange 54*b* is preferably a flat, annular ring so the fire ring plate 38 is supported around a substantial majority of the circumference of the plate 38 by the flange 54*b*. The base flange 54*b* advantageously has an inner diameter larger than the outer diameter of the tubular sleeve 30, to provide a more stable support for the tubular sleeve. Each stiffener 70*b* may take the form of a triangular plate in a radial plane with a bottom on the base flange 54*b* and a top connecting to the tubular sleeve 30 at the bottom of the tubular sleeve 30. Advantageously, each stiffener 70*b* has an inverted, L-shaped notch 80 on the inside of each stiffener with the short leg of the L-shaped notch in the plane of the bottom of the ledge 62 and the long leg generally parallel to longitudinal axis 22 and the inner face of the short base wall 60*b*. The L-shaped notches 80*b* circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80*b*, and has a generally vertical and circular outer wall circumscribed by the long leg of the inverted L-shaped notch 80*b* and the short base wall 60*b*. From the side as seen in FIG. 12C, it looks like each stiffener 70*b* has two notches or steps in it. The short wall 60*b* allows concrete to readily enter the space below the tubular sleeve 30 and outside the intumescent ring 26.

The location of the base wall 60*b* radially outside the tubular sleeve 30 and ledge 62, allows air to vent upward which avoids unintentional voids in the concrete inside the base 28*b*. The short base wall 60*b* is believed to stiffen the base 28*b*. The construction is believed to provide for more complete concrete encasement of the sleeve assembly and the intumescent ring. The base flange 54 provides support and protection for the thin fire ring plate 38 as the concrete is poured.

Figure 13A:
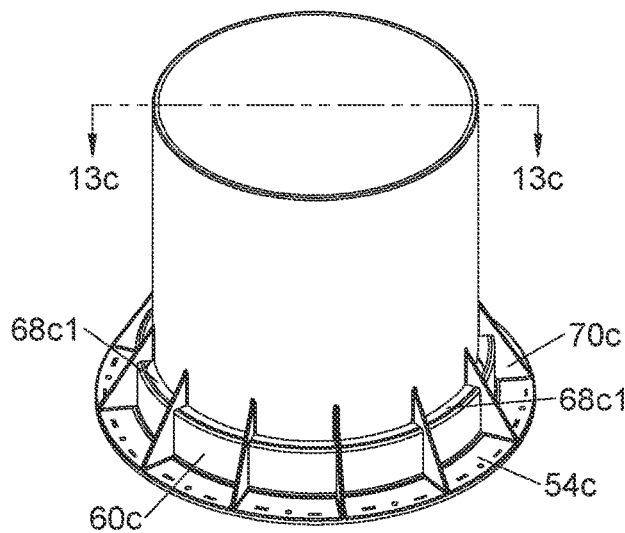
FIG. 13A is a perspective view of the top of a sleeve assembly having a base with a base flange and a high base wall all connected by stiffeners to the tubular sleeve.
Figure 13B:
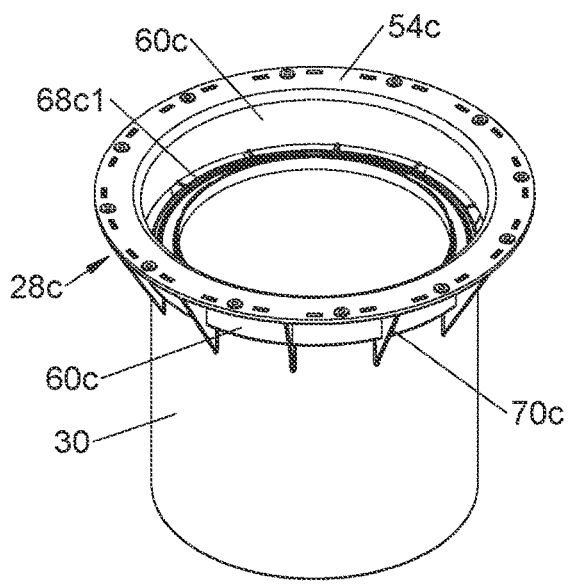
FIG. 13B is a bottom perspective view of the sleeve assembly of FIG. 13A.
Figure 13C:
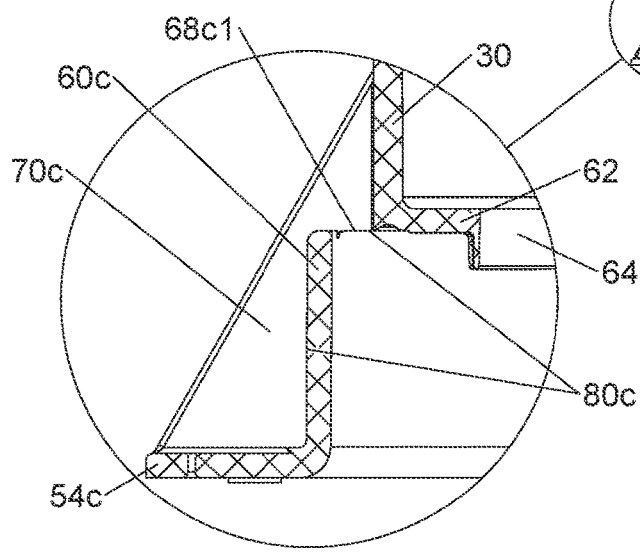
FIG. 13C is a cross-sectional view taken along section 13C-13C of FIG. 13A.

FIGS. 13A-13C show the annular base 28*c* as having a long or high base wall 60*c* extending to the same plane as the bottom of the ledge 62. The tubular sleeve 30 is connected to a flat, annular base flange 54*c* and to the long base wall 60*c* by stiffeners 70*b* that preferably extend in radial planes through longitudinal axis 22. The base wall 60*c* is outward of the tubular sleeve 30 so there is a vertical space between the wall and sleeve, forming an annular space through which concrete enters and air leaves. This annular space is interrupted by the stiffeners 70*c*, and the space between the stiffeners 70*c* form vertically facing windows 68*c*1 allowing access to the inside of the base 28*c* along axis 22. The base flange 54*c* is preferably a flat, annular ring so the fire ring plate 38 is supported around a substantial majority of the circumference of the plate 38 by the flange 54*c*. The base flange 54*c* advantageously has an inner diameter larger than the outer diameter of the tubular sleeve 30, to provide a more stable support for the tubular sleeve.

Each stiffener 70*c* may take the form of a triangular plate in a radial plane with a bottom on the base flange 54*c* and a top connecting to the tubular sleeve 30 at the bottom of the tubular sleeve 30. Advantageously, each stiffener 70*c* has an inverted, L-shaped notch 80*c* on the inside of each stiffener with the short leg of the L-shaped notch in the plane of the bottom of the ledge 62 and the long leg generally parallel to longitudinal axis 22 and joining the inner face of the long base wall 60*c*. The L-shaped notches 80*c* and the base wall 60*c* circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80*c*, and has a generally vertical and circular outer wall circumscribed by the long base wall 60*c*. The annular gap between the base wall 60*c* and the tubular sleeve 30 allows concrete to readily enter the space below the tubular sleeve 30 and outside the intumescent ring 26.

The location of the base wall 60*c* radially outside the tubular sleeve 30 and ledge 62, allows air to vent upward which avoids unintentional voids in the concrete inside the base 28*c*. The long base wall 60*c* is believed to stiffen the base 28*c*, but because of the restricted size of the annular opening formed by windows 68*c* compared to other embodiments, and because of the vertical or axial orientation of the windows 68*c*, the windows 68*c* may not allow concrete to enter as easily into the area around the outside of the intumescent ring 26. The construction is believed to provide for more a strong base 28*c* while allowing complete concrete encasement of the sleeve assembly 20 and the intumescent ring 26. The base flange 54 provides support and protection for the thin fire ring plate 38 as the concrete is poured.

FIGS. 14A-14C show the annular base 28*d* as having a long or high base wall 60*d* extending to the same plane as the bottom of the ledge 62. The tubular sleeve 30 is connected to a flat, annular base flange 54*d* and to the long base wall 60*d* by stiffeners 70*d* that preferably extend in radial planes through longitudinal axis 22. The base wall 60*d* is outward of the tubular sleeve 30 so there is a vertical space between the wall and sleeve, forming an annular space through which concrete enters and air leaves. This annular space is interrupted by the stiffeners 70d, and the space between the stiffeners 70d form vertically facing windows 68d1 allowing access to the inside of the base 28d. Additionally, outwardly facing side windows 68d2 are formed in the base wall 60d, with those windows facing radially outward. The side facing windows 68d2 may extend upward and merge with the vertically facing windows 68d1, or they may be separated from the vertically spaced windows by headers 82d formed by the portion of the base wall 60d above the side window 68d2 and below or outward from the vertical window 68d1. The bottom of the window 68d is separated from the base flange 54d by sill 84d. Further, the side windows 68d2 are located between every other set of stiffeners so the side windows 68d2 are spaced circumferentially about the base 28d. The vertical windows 68d1 may also be spaced between alternate sets of stiffeners 70d, either aligned with the side windows 68d2, or between adjacent side windows 68d2.

The base flange 54d is preferably a flat, annular ring so the fire ring plate 38 is supported around a substantial majority of the circumference of the plate 38 by the flange 54d. The base flange 54d advantageously has an inner diameter larger than the outer diameter of the tubular sleeve 30, to provide a more stable support for the tubular sleeve. Each stiffener 70d may take the form of a triangular plate in a radial plane with a bottom on the base flange 54d and a top connecting to the tubular sleeve 30 at the bottom of the tubular sleeve 30. Advantageously, each stiffener 70d has an inverted, L-shaped notch 80d on the inside of each stiffener with the short leg of the L-shaped notch in the plane of the bottom of the ledge 62 and the long leg generally parallel to longitudinal axis 22 and joining the inner face of the long base wall 60d. The L-shaped notches 80d and the base wall 60d circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80d, and has a generally vertical and circular outer wall circumscribed by the long base wall 60d. The annular gap between the base wall 60d and the tubular sleeve 30 allows concrete to readily enter the space below the tubular sleeve 30 and outside the intumescent ring 26.

The location of the base wall 60d radially outside the tubular sleeve 30 and ledge 62, allows air to vent upward which avoids unintentional voids in the concrete inside the base 28d. The long base wall 60d is believed to stiffen the base 28d and having side windows 68d2 at wider spaced, circumferential locations also stiffens the base 28. Advantageously, the side windows 68d2 are located between alternate pairs of stiffeners 70d. Because of the vertical venting of air through the annular space created by the vertical facing portion of windows 68d1, and because of the outward facing side windows 68d2, it is believed that concrete can readily enter (an air vent from) the area around the outside of the intumescent ring 26. The construction is believed to provide for more a strong base 28d while allowing complete concrete encasement of the sleeve assembly 20 and the intumescent ring 26. The base flange 54 provides support and protection for the thin fire ring plate 38 as the concrete is poured.

FIGS. 15A-15C show the annular base 28e as having a long or high base wall 60e extending to the same plane as the bottom of the ledge 62. The tubular sleeve 30 is connected to a flat, annular base flange 54e and to the long base wall 60e by stiffeners 70e that preferably extend in radial planes through longitudinal axis 22. The base wall 60e is outward of the tubular sleeve 30 so there is a vertical space between the wall and sleeve, forming an annular space through which concrete enters and air leaves. This annular space is interrupted by the stiffeners 70e, and the space between the stiffeners 70e form vertically facing windows 68e1 allowing access to the inside of the base 28e. Additionally, outwardly facing side windows 68e2 are formed in the base wall 60e, with those windows facing radially outward and preferably located between each set or pair of stiffeners 70e. The side facing windows 68e2 may extend upward and merge with the vertically facing windows 68e1, or they may be separated from the vertically spaced windows by headers 82e formed by the portion of the base wall 60e above the side window 68e2 and below or outward from the vertical window 68e1. Further, the side windows 68e2 are located between every pair or set of stiffeners 70f so the side windows 68e2 are spaced circumferentially about the base 28e. The vertical windows 68e1 may also be spaced between alternate sets of stiffeners 70e, either aligned with the side windows 68e2, or between adjacent side windows 68e2.

The base flange 54e is preferably a flat, annular ring so the fire ring plate 38 is supported around a substantial majority of the circumference of the plate 38 by the flange 54e. The base flange 54e advantageously has an inner diameter larger than the outer diameter of the tubular sleeve 30, to provide a more stable support for the tubular sleeve. Each stiffener 70e may take the form of a triangular plate in a radial plane with a bottom on the base flange 54e and a top connecting to the tubular sleeve 30 at the bottom of the tubular sleeve 30. Advantageously, each stiffener 70e has an inverted, L-shaped notch 80e on the inside of each stiffener with the short leg of the L-shaped notch in the plane of the bottom of the ledge 62 and the long leg generally parallel to longitudinal axis 22 and joining the inner face of the long base wall 60e. The L-shaped notches 80e and the base wall 60e circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80e, and has a generally vertical and circular outer wall circumscribed by the long base wall 60e. The annular gap between the base wall 60e and the tubular sleeve 30 allows concrete to readily enter the space below the tubular sleeve 30 and outside the intumescent ring 26.

The location of the base wall 60e radially outside the tubular sleeve 30 and ledge 62, allows air to vent upward which avoids unintentional voids in the concrete inside the base 28e. The long base wall 60e and headers 82e above each side window 68e2 are believed to stiffen the base 28e and having side windows 68e2 between each stiffener 70e is believed to allow concrete to readily enter the base 28e and entrain the intumescent ring 26 while the vertically facing windows 68e1 are believed to allow air to vent and avoid unintended voids in the sleeve assembly. The construction is believed to provide for a strong base 28e while allowing complete concrete encasement of the sleeve assembly 20 and the intumescent ring 26. The base flange 54 provides support and protection for the thin fire ring plate 38 as the concrete is poured.

Figure 16A:
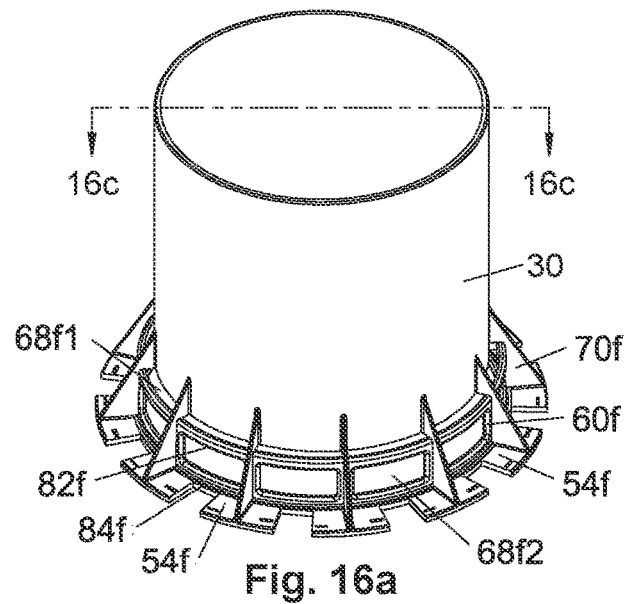
FIG. 16A is a perspective view of the top of a sleeve assembly having a base with an intermittent base flange and a high base wall all connected by stiffeners to the tubular sleeve, with windows between each of the stiffeners.
Figure 16B:
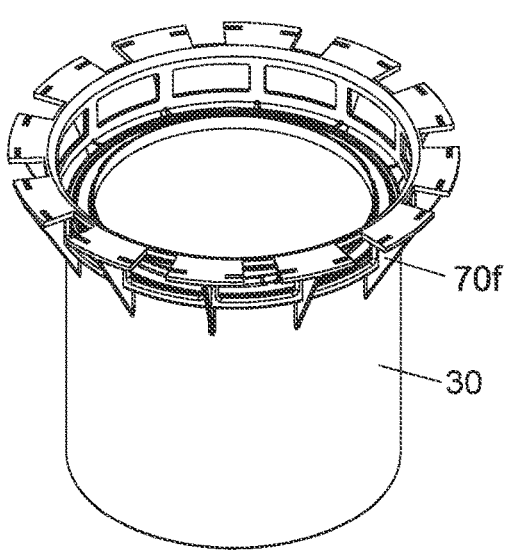
FIG. 16B is a bottom perspective view of the sleeve assembly of FIG. 16A.
Figure 16C:
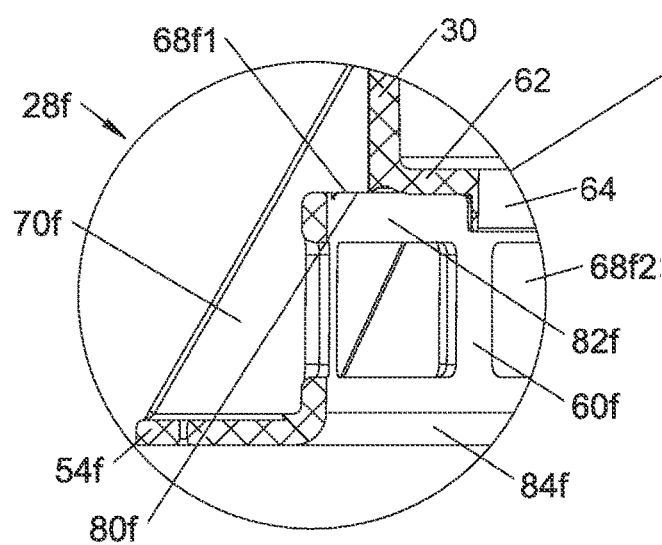
FIG. 16C is a cross-sectional view taken along section 16C-16C of FIG. 16A.

FIGS. 16A-16C show the annular base 28f as having a long or high base wall 60f extending to the same plane as the bottom of the ledge 62. The tubular sleeve 30 is connected to a flat, annular base flange 54f that is intermittent or segmented rather than continuous with each segment separated by a space from the adjacent segments of the base flange. Each segment of the segmented base flange 54f is connected to the long base wall 60f and connected to at least one stiffener 70f, with each stiffener preferably extending in a radial plane through longitudinal axis 22. The segments may extend across two or more adjacent stiffeners 70f before a gap separating segments appears. The top of the base wall 60f is advantageously not connected to the ledge 62 so as to form an annular, axially facing window 68/1 between the stiffeners 70f. A window header 82f above the side window 68/2, and a window sill 84f below each side window 63/2, are believed to provide circumferential stiffness. The base wall 60f is outward of the tubular sleeve 30 so there is a vertical space between the wall and sleeve, forming an annular space through which concrete enters and air leaves. This annular space is interrupted by the stiffeners 70f, and the space between the stiffeners 70f form vertically facing windows 68/1 allowing access to the inside of the base 28f. Additionally, outwardly facing side windows 68/2 are formed in the base wall 60f, with those windows facing radially outward and preferably located between each set or pair of stiffeners 70f, and between each adjacent segment of the segmented base flange 54f. The side facing windows 68/2 may extend upward and merge with the vertically facing windows 68e1, or they may be separated from the vertically spaced windows by headers 82f formed by the portion of the base wall 60f above the side window 68/2 and below or outward from the vertical window 68/1. Advantageously, but optionally, a window sill 84f is opposite and below each window header 82f to provide circumferential strength. The headers and sills 82f, 84f extend to the portions of the base wall 60f associated with the segments of the base flange 54f, and connected to a stiffener 70f. Further, the side windows 68/2 are located between every set or pair of stiffeners 70f. The vertical windows 68/1 may be spaced between alternate sets of stiffeners 70f, or as shown, be spaced between each pair of stiffeners 70f so a vertical window is aligned with each side window 68/2.

The base flange 54f is preferably a flat, annular ring that is molded to form segments with spaces interposed between each segment, with the fire ring plate 38 connected to and supported by each segment to provide an annular, but discontinuous support around a majority or less than a majority of the circumference of the plate 38—depending on the circumferential length of the segments of the base flange. The base flange 54f advantageously has an inner diameter larger than the outer diameter of the tubular sleeve 30, to provide a more stable support for the tubular sleeve. Each stiffener 70f may take the form of a triangular plate in a radial plane with a bottom on the base flange 54f and a top connecting to the tubular sleeve 30 at the bottom of the tubular sleeve 30. Advantageously, each stiffener 70f has an inverted, L-shaped notch 80f on the inside of each stiffener with the short leg of the L-shaped notch in the plane of the bottom of the ledge 62 and the long leg generally parallel to longitudinal axis 22 and joining the inner face of the long base wall 60f. The L-shaped notches 80f and the base wall 60f circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80f, and has a generally vertical and circular outer wall circumscribed by the long base wall 60f. The annular gap between the base wall 60f and the tubular sleeve 30 allows concrete to readily enter the space below the tubular sleeve 30 and outside the intumescent ring 26.

The location of the base wall 60f radially outside the tubular sleeve 30 and ledge 62, allows air to vent upward which avoids unintentional voids in the concrete inside the base 28f. The long base wall 60f and headers 82f and sills 84f above and below each side window 68/2 are believed to stiffen the base 28f and having side windows 68/2 between each stiffener 70f is believed to allow concrete to readily enter the base 28f and entrain the intumescent ring 26 while the vertically facing windows 68/1 are believed to allow air to vent and avoid unintended voids in the sleeve assembly. The construction is believed to provide for a strong base 28f while allowing complete concrete encasement of the sleeve assembly 20 and the intumescent ring 26. The base flange 54 provides support and protection for the thin fire ring plate 38 as the concrete is poured.

FIGS. 17A-15C show a continuous annular base 28f and no base wall 60f. The construction is much like that of FIGS. 11A-11C and description of the common parts is not repeated, although corresponding parts are renumbers with a "g" instead of "a." A stiffening ring 86f is connected to the inner edge of stiffeners 70f to provide circumferential stiffening between the stiffeners and to strengthen and stabilize the stiffeners in the lateral plane. The space between the stiffeners 70g form windows 68g having a side facing opening and having a vertically facing opening, both of which allow access to the inside of the base 28g. The base flange 54g is preferably a flat, annular ring so the fire ring plate 38 is supported around a substantial majority of the circumference of the plate 38 by the flange 54g. The base flange 54g has an inner diameter larger than the outer diameter of the tubular sleeve 30, to provide a more stable support for the tubular sleeve and to allow air to vent around the outside of the sleeve 30. Each stiffener 70g may take the form of a triangular plate in a radial plane with a bottom on the base flange 54g and a top connecting to the tubular sleeve 30 at the bottom of the tubular sleeve 30. Advantageously, each stiffener 70g has an inverted, L-shaped notch 80g on the inside of each stiffener with the short leg of the L-shaped notch in the plane of the bottom of the ledge 62 and the long leg generally parallel to longitudinal axis 22. The L-shaped notches 80g circumscribe an outer portion of an annular space extending around the outside of the depending lip 64 and within which the intumescent ring 26 may fit during use. The circumscribed space has a flat top defined by the bottom of ledge 62 and the short leg of the inverted L-shaped notch 80g, and has a generally vertical and circular outer wall circumscribed by the long leg of the inverted L-shaped notch 80g. The absence of base wall 60 allows concrete to more readily enter the space below the tubular sleeve 30 and outside the intumescent ring 26. The absence of a base wall 60 allows air to vent upward which avoids unintentional voids in the concrete inside the base 28g. The construction is believed to provide for more complete concrete encasement of the sleeve assembly and the intumescent ring while providing more lateral or circumferential stiffness of the stiffeners 70g. The base flange 54g provides support and protection for the thin fire ring plate 38 as the concrete is poured.

As reflected by FIGS. 11-17, the base flange 54 may be continuous (FIGS. 4-5, 11-15 & 17) or segmented (FIG. 16), the base wall 60 may be of various axial height (FIGS. 4-5, 12-15), or omitted entirely (FIGS. 11, 17), the windows 68 may be spaced circumferentially close (FIGS. 4-5, 11-13, 15-17) or spaced intermittently around the circumference of the base (FIG. 14), the windows 68 may be short (FIG. 12) or tall (FIGS. 11, 17), the windows 68 may open only vertically (FIG. 14) or open to the side only (e.g., radially)

by having continuous ledge 62 or open both vertically and to the side (FIGS. 4-5, 11-12, 14-17. A stiffener 70 may be between each window 68 (FIGS. 4-5, 11-12), or a plurality of stiffeners may separate each window (FIG. 14). The stiffeners 70 may provide the only axial connection between the base 54 and tubular sleeve 30 (FIGS. 11-13, 17) or the stiffeners and base wall 60 may provide the connection (FIGS. 4-5, 14-16), or the base wall 60 may provide the sole connection (see parts of FIG. 14 with no windows between stiffeners). The stiffeners 70 may connect the base flange 54 to only the base wall 60 (FIGS. 4-5), or may connect the base flange to only the tubular sleeve 30 (FIGS. 11, 17), or may connect to both the base flange and the tubular sleeve (FIGS. 4-5, 12-16). The base wall 60 may connect to the tubular sleeve 30 (FIGS. 4-5, 12-16, or not (FIGS. 11-17) depending in part on the axial height of the base wall and the extent to which the ledge 62 extends outward to connect to the base wall (FIGS. 5, 7, 14) around differing circumferential lengths of the ledge 62.

In use, one or more strips of intumescent material are wrapped around the positioning tabs 40 to form a ring of intumescent material 26 of desired radial thickness and axial height. The intumescent material is provided in strips having thicknesses that include $\frac{1}{32}$, $\frac{1}{8}$, $\frac{1}{4}$ and thicker strips (2 mm, 3.2 mm and 6.4 mm). The strips may be cut to length and wrapped around positioning tabs 40 to form one or more concentric layers or rings. If the more than one ring of intumescent material is used, each ring is concentric contacts the other ring or rings, and the outer ring extends further into the void space 76 and toward base wall 60. If the strip of intumescent material is not of sufficient height, more than one ring or set of concentric rings can be stacked on top of each other, or a strip can be cut to a desired axial height before being wrapped to form the circular ring.

Instead of wrapping one or more strips of intumescent material around the positioning tabs 40, a single ring of the desired axial length and radial thickness may be placed around the positioning tabs 40 so as to contact and be centered by those positioning tabs so as to be centered around the circular opening in the fire ring base 38 and thus centered along the longitudinal axis 22 during use. Alternatively, a plurality of concentric rings of intumescent material of increasing diameters can be nested together to form the desire ring of intumescent material. Depending on the radial thickness of the intumescent ring or concentric rings 26, the annular void space 76 may be large or very small.

The sub-assembly of the intumescent ring 26 placed on the fire ring 24 is then connected to the base 28 and tubular sleeve 30 by passing aligning the plurality of entraining tabs 46 and locking tabs 42 with the respective holes 56, 52 for those tabs, and then moving the base 28 and fire ring 24 relative to each other so the tabs 46, 42 pass through the respective holes 56, 52 until the bottom of the base 28 rests against the top of the fire ring plate 38. Usually, the base 28 is aligned along axis 22, rotated to align the openings 46, 52 and 58 with the tabs 46, 42 and hole 44, and then the base 28 is moved toward the fire ring 24 until base flange 54 contacts the fire ring plate 38. This alignment and axial movement also nests the positioning tabs 40 and intumescent ring 26 inside the space bounded by the depending flange 64, ledge 62 and base wall 60. The locking tabs 42 are then bent over (FIGS. 5, 7) to secure the fire ring base 38 and fire ring 24 to the base 28 and tubular sleeve 30. The entrainment tabs 46 extending through the holes 56 in the base 28 may be left undeformed or bent slightly as those tabs 46 are entrained by the poured fluid concrete to interlock the concrete with the tabs 46 and associated base 28 and fire ring 24.

To allow the intumescent ring 26 to be easily inserted into the outer diameter of the intumescent ring 26 is smaller than the inner diameter of the base wall 60. A difference in diameters of 0.1 to 0.03 inches is believed suitable (2.5 mm to 0.8 mm).

The smoke ring 34 may be fastened to the base 28 before or after the fire ring 24 and intumescent ring 26 are connected to the base. Advantageously, an adhesive is coated to the outer periphery of the annular smoke ring 34, and the ring is inserted downward through the top end of the sleeve 30 to adhere the smoke ring to the inner surface of the depending lip 64. The smoke ring 34 may be inserted from the bottom of the base 28 and adhered to the depending lip 64, before or after the base 28 is connected to the fire ring 24 and intumescent ring 26. Insertion through the base 28 has a shorter axial distance to move the fire ring 24 and is preferred.

After the above parts are assembled, the sleeve assembly 20 is fastened to the concrete form. The base 28 is fastened to a concrete form, preferably by passing fasteners through the aligned openings 44 and holes 24 and into the concrete form or into a suitable bracket that in turn is connected to the concrete form. The cap 32 may be attached to the tubular sleeve 30 before or after the sleeve assembly is fastened to the concrete form, but before fluid concrete is poured.

After the sleeve assembly 20 is connected to the concrete form and the cap 32 covers the opening of the tubular sleeve 30, fluid concrete is poured around the sleeve assembly to entrain the assembly in concrete. The wet concrete is finished by suitable means that will vary with the surface finish desired for the concrete deck. Typically, a vibrator is applied to the wet concrete surface which may further help ensure that air leaves the void space 76 and concrete enters through windows 68 to fill the void space 76 and entrain the sleeve assembly in the concrete. After the concrete hardens to form the solid concrete deck, the cap 32 is removed and the penetrants may be passed through the sleeve assembly 20.

Advantageously, when the penetrant is a metal pipe, it is believed suitable to use one or two intumescent rings, each having a small radial thickness so as to create a large void space 76 having a radial thickness 2 to 4 times the total radial thickness of the intumescent ring 26. A thin radial thickness is believed suitable because the metal pipe does not melt during fires and the intumescent material thus need only expand sufficiently during a fire to seal against the outer surface of the metal pipe to block the flow of gas or water through the passage through the concrete deck created by the sleeve assembly 20.

When the penetrant is a plastic pipe, it is believed suitable to use three or four concentric rings of intumescent material, possibly more, so the total radial thickness is much greater than with a metal penetrant and so there is little or no void space 76. A single ring of larger radial thickness could be used instead of laying up concentric rings to achieve the desired radial thickness of the intumescent ring. When the intumescent ring 26 fills or substantially fills the space bounded by parts 40, 64, 62, 60 and 38, the void space 76 is preferably a radially thin, annular space in communication with the vent slots 48. That way, if insufficient void space 76 is left to allow the fluid, poured concrete particles to fill the thin, annular space, then smoke may enter the void space 76 and heat the outer surface of the intumescent ring 26 during a fire. A larger radial thickness of the intumescent ring 26 is needed for plastic penetrants because the plastic will normally melt or burn during a fire and thus the intumescent material must expand inward toward axis 22 a much greater distance in order to block the passage through the concrete deck formed by sleeve assembly 20.

If it is desired to have an annular, concrete ring surrounding the outer wall of the intumescent ring 26, the radial thickness of the ring 26 may be adjusted accordingly, as may the dimensions of the parts defining the annular void space 76 to ensure the intumescent material blocks the passage through the sleeve assembly 20 while also allowing concrete to enter the void space 76 through windows 68 to encase the outer circumference of the fire ring 26 and better entrain the fire ring and sleeve assembly 20 in the concrete.

The fire ring 24 is preferably made of thin, sheet metal, with galvanized steel believed suitable. All parts of the fire ring 24 may be punched out of a continuous, flat sheet of metal with the tabs 42, 42 and 46 bent into a position perpendicular to the plane of the fire ring plate 38 and the central opening and holes 58 punched or cut by forming operations known in the art. Any suitable intumescent material may be used for the intumescent ring 26, including integrally molded rings of the desired size, or wrapped strips forming concentric rings of the desired radial thickness, or stacked rings or concentric strips to form the desired axial height.

Because the open windows 68 allow wet concrete to enter the base 28 when the deck is poured, a block is preferably, but optionally, provided to block that wet concrete from entering the passage formed by the sleeve assembly 20. Advantageously, the intumescent ring 26 extends between the fire ring plate 38 to the lateral ledge 62, or immediately adjacent the lateral ledge 62 a distance to block concrete from flowing into the passage when the deck is poured and the assembly 20 is entrained in wet concrete. Concrete is made from a mixture of cement and aggregate, with the cement having particles that are many times smaller than the aggregate which can vary from the size of sand to gravel to rocks. Sometimes a little cement leakage into the passage may occur, but the spacing is preferably small enough that the aggregate (e.g., sand and gravel) in the concrete cannot pass.

Alternatively, a gap may be intentionally left between the lateral ledge 62 and the top of the intumescent ring 26 as long as the depending lip 64 either seals against the inner circumference of the intumescent ring or is immediately adjacent that inner circumference so that little or no wet concrete passes between the depending lip and the top of the intumescent ring. It is believed permissible to allow small amounts of cement to pass through the sleeve assembly 20 but even small amounts of concrete are not desirable. Large amounts of concrete could block the passage through the sleeve assembly 20 and even smaller amounts of concrete embedding portions of the sleeve assembly could result in breaking part of the sleeve to remove that hardened concrete. Thus, the intumescent ring advantageously forms a seal around the circumference of the base 28, between the top ledge 62 and the concrete form that prevents concrete and aggregate in the concrete from entering the passageway formed by the sleeve assembly 20, but that may allow small amounts of cement to leak through.

Preventing wet concrete from blocking the passage formed by the sleeve assembly 20 is thus preferably achieved by a suitable seal between the intumescent ring 26 and the ledge 62 and/or depending lip 64 on the top end of the base. An annular guard ring 73 (FIG. 8) could also be inserted between the outside of the intumescent ring and the open windows 68 or outer wall 60. A thin sheet of plastic that can buckle under axial compression between the ledge 62 and the fire ring plate 38 while having enough radial strength to block the flow of wet concrete is believed suitable for use as a guard ring 73. A guard ring 73 comprising a thin-walled cylinder of plastic having a radial thickness of about 1 to 3 mm is believed suitable when made of polyethylene, polypropylene or PVC.

The base 28 includes base flange 54, flange 62, depending lip 64, stiffening plates 70 and retaining lip 72 and these parts, along with tubular sleeve 30 are all preferably of a suitable plastic, with PVC (polyvinylchloride) believed suitable. Advantageously, these parts forming the base 28 and tubular sleeve 30 are injection molded of plastic in a single operation to form a single-piece, integrally molded, unitary plastic part. The openings 56, 52, 58 and windows 68 are formed during that same molding operation. The cap 32 and its removable connection mechanism such as latches 74 may be of any material, including metal, but are preferably also of plastic, preferably PVC.

The sleeve assembly 20 is believed especially useful with larger diameter sleeves 30, preferably from 6 to 12 inches nominal diameter where the volume of the intumescent ring 26 is large and it is costly to make and stock housings to accommodate fire rings of different inner and outer diameters. Also, the formation of a concrete ring surrounding some or all of the outer circumference of the fire ring 26 is believed to provide for a stronger passage through the concrete and a more direct support for the inward expansion of the intumescent material during fires.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of fastening the fire ring 24 to the base 28, and of fastening the cap 32 to the tubular sleeve 30. Further, the various features of this invention can be used alone, or in varying combinations with each other and are not intended to be limited to the specific combination described herein. Thus, the invention is not to be limited by the illustrated embodiments.

What is claimed is:

1. A sleeve assembly for forming a passage extending along a longitudinal axis through a poured concrete deck, the sleeve assembly comprising:
   a fire ring having a fire ring plate with a circular opening centered about a longitudinal axis, the fire ring having a ring of intumescent material centered around the circular opening and centered on the longitudinal axis, the ring of intumescent material having a height along the longitudinal axis and a maximum radial thickness in a plane orthogonal to the longitudinal axis;
   a tubular sleeve extending along the longitudinal axis and having an open top at one end of the tubular sleeve and a laterally extending ledge at the other end of the tubular sleeve; and
   a base connected to the tubular sleeve, the base having a base flange that extends outward in a plane orthogonal to the longitudinal axis and having an inner base flange edge that defines a base opening centered on the longitudinal axis with that base opening being slightly larger than the tubular sleeve, the fire ring plate being fastened to the base flange with the ring of intumescent material extending through the base opening toward the tubular sleeve, the base having a base wall extending from the inner base flange edge along the longitudinal axis in the direction of the tubular sleeve, the base having a plurality of stiffeners extending between the base flange and at least one of the tubular sleeve, the base wall, or both the tubular sleeve and the base wall, the base wall having an axial height that is below a top of the ledge, the base wall forming an annular space around a bottom of the tubular sleeve, the ledge extending outward from the tubular sleeve to connect to the base wall, the base wall having a plurality of windows extending therethrough with each window being located between two adjacent stiffeners, at least some of the windows extending through a portion of the ledge; and wherein the ring of intumescent material is located laterally between a depending lip and the plurality of stiffeners and the base wall, and wherein the ring of intumescent material is located vertically between the ledge and the fire ring plate.

2. The sleeve assembly of claim 1, wherein the ledge has the depending lip at an inwardly extending side of the ledge with the depending lip cooperating with the ring of intumescent material to keep concrete from flowing into the passage when the concrete deck is poured.

3. The sleeve assembly of claim 1, wherein the ring of intumescent material has an outward facing side that is located a distance from an inward facing side of the base wall, which distance is between 0.0 and 0.1 inches.

4. The sleeve assembly of claim 1, wherein the ring of intumescent material has an outward facing side that is spaced from an inward facing side of the base wall to create an annular void space opening onto the plurality of windows.

5. The sleeve assembly of claim 1, wherein the ring of intumescent material comprises one ring of intumescent material around a plurality of positioning tabs extending upward from the fire ring plate around the circular opening in the fire ring plate, the one ring of intumescent material having a radial thickness less than a radial distance between an outward facing side of the ring of intumescent material and an inward facing side of one of the plurality of stiffeners in an orthogonal plane through a top of the ring of intumescent.

6. The sleeve assembly of claim 1, wherein the ring of intumescent material comprises a plurality of concentric and contacting rings of intumescent material encircling a plurality of positioning tabs that extend upward from the fire ring plate around the circular opening in the fire ring plate, the ring of intumescent material extending to within 0.0 and 0.1 inches of an inward facing surface of the base wall.

7. The sleeve assembly of claim 1, wherein the fire ring plate has a plurality of locking tabs extending through aligned openings in the base flange to connect the fire ring to the fire ring plate.

8. The sleeve assembly of claim 1, further comprising a removable cap covering the open top of the tubular sleeve.

9. The sleeve assembly of claim 1, further including a smoke ring connected to the depending lip.

10. The sleeve assembly of claim 1, wherein the ring of intumescent material includes from three to five concentric rings of intumescent material.

11. A sleeve assembly for creating a passage extending along a longitudinal axis through a poured concrete deck, comprising:
    a tubular sleeve extending along the longitudinal axis and having an outer diameter, the tubular sleeve further having a lateral ledge extending inward from a bottom of the tubular sleeve to form a circular opening encircling the longitudinal axis during use;
    a base flange encircling the longitudinal axis and having an inner diameter larger than the outer diameter of the tubular sleeve, a plurality of stiffeners, and a base wall connecting the base flange to the bottom of the tubular sleeve; and
    a ring of intumescent material connected to a fire ring plate that is connected to the base flange so the ring of intumescent material is located below the bottom of the tubular sleeve and encircles the longitudinal axis at a location inside the plurality of stiffeners and the base wall, and wherein the plurality of stiffeners and the base wall are configured so concrete can enter a space between the ledge and the base flange by passing through at least one of: (a) spaces between adjacent stiffeners and the ring of intumescent material; or (b) spaces between the base wall and the bottom of the sleeve; or (c) a plurality of windows in the base wall facing a direction lateral to the longitudinal axis, or (d) any combination of (a) and (b) and (c).

12. The sleeve assembly of claim 11, including the base wall which extends along the longitudinal axis and is connected to the plurality of stiffeners.

13. The sleeve assembly of claim 11, including the base wall and the plurality of windows in the base wall.

14. The sleeve assembly of claim 11, including a cap configured to cover a top end of the tubular sleeve.

15. The sleeve assembly of claim 11, further including a lip depending from an inner edge of the ledge and contacting the ring of intumescent material or sufficiently close to the ring of intumescent material to block concrete from flowing between the ring of intumescent material and the depending lip and into the passage when the concrete deck is poured.

16. The sleeve assembly of claim 11, wherein the plurality of stiffeners and the base wall are configured so the space between the ledge and the base flange also includes a further space enclosing an outer periphery of the ring of intumescent material.

17. A sleeve assembly for creating a passage extending along a longitudinal axis through a poured concrete deck, comprising:
    a tubular sleeve extending along the longitudinal axis and having an outer diameter, the tubular sleeve further having a lateral ledge extending inward from a bottom of the tubular sleeve to form a circular opening encircling the longitudinal axis during use; and
    a base flange encircling the longitudinal axis and having an inner diameter larger than the outer diameter of the tubular sleeve, a plurality of stiffeners connecting the base flange to the bottom of the tubular sleeve with windows between adjacent stiffeners of the plurality of stiffeners for allowing passage of poured concrete between adjacent stiffeners in a radial direction.

18. The sleeve assembly of claim 17, further comprising a ring of intumescent material connected to a fire ring plate that is connected to the base flange so the ring of intumescent material is located below the bottom of the tubular sleeve and encircles the longitudinal axis at a location inside the plurality of stiffeners.

19. The sleeve assembly of claim 17, further comprising a base wall connected to the base flange and the plurality of stiffeners, the base wall for reducing the passage of poured concrete between adjacent stiffeners in the radial direction.

20. The sleeve assembly of claim 17, further comprising a ring of intumescent material connected to a fire ring plate that is connected to the base flange so the ring of intumescent material is located below the bottom of the tubular sleeve and encircles the longitudinal axis at a location inside the plurality of stiffeners and a base wall.

21. The sleeve assembly of claim 20, wherein the windows face a direction lateral to the longitudinal axis.

\* \* \* \* \*